FIG.3.

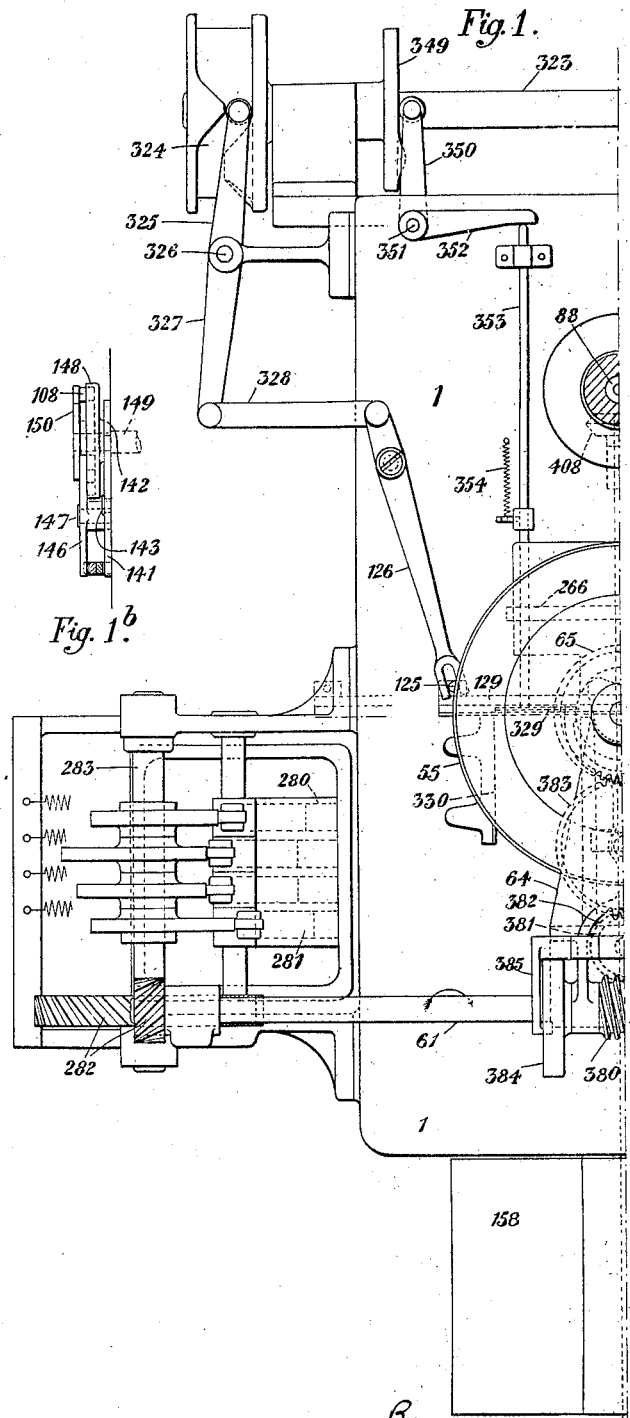

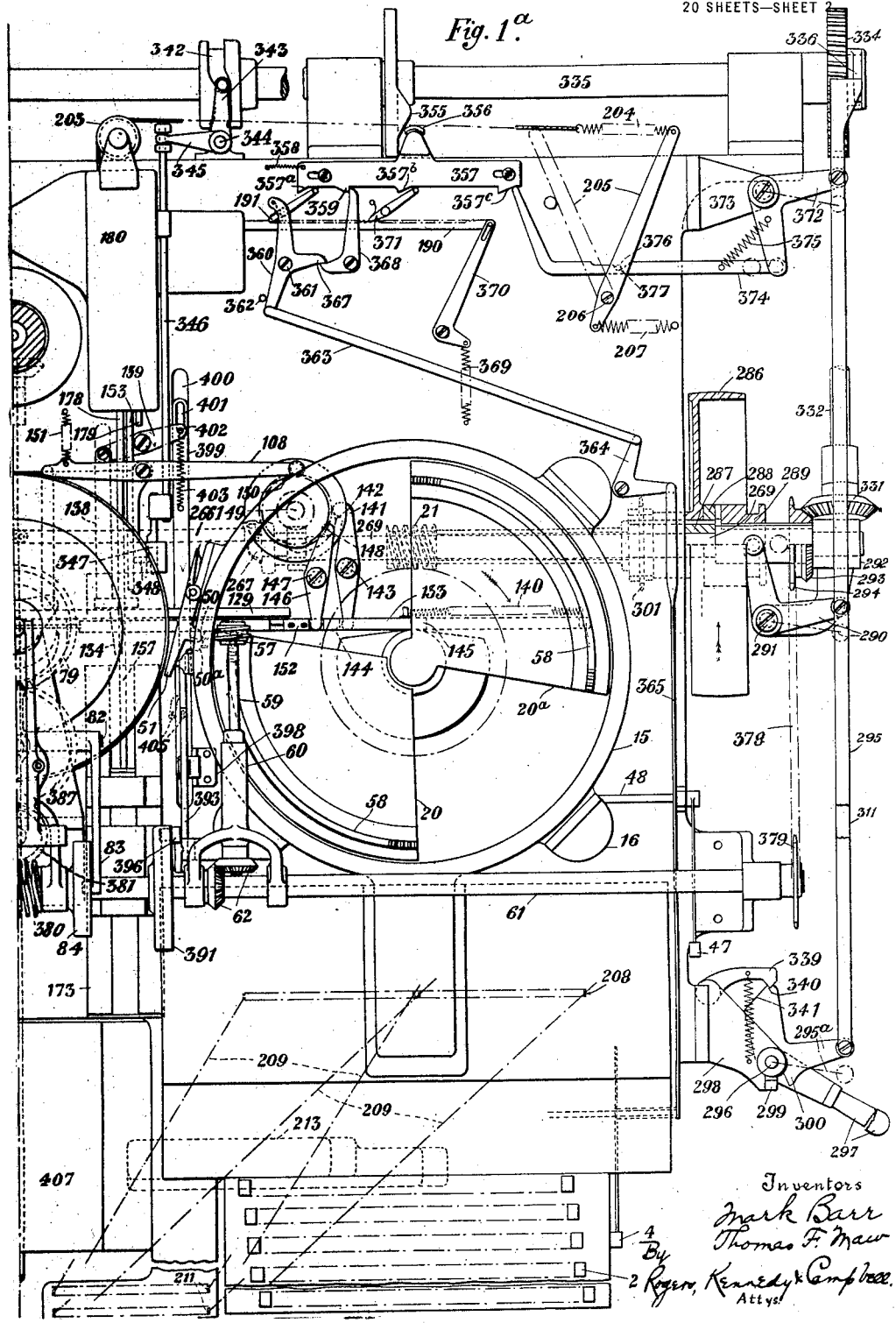

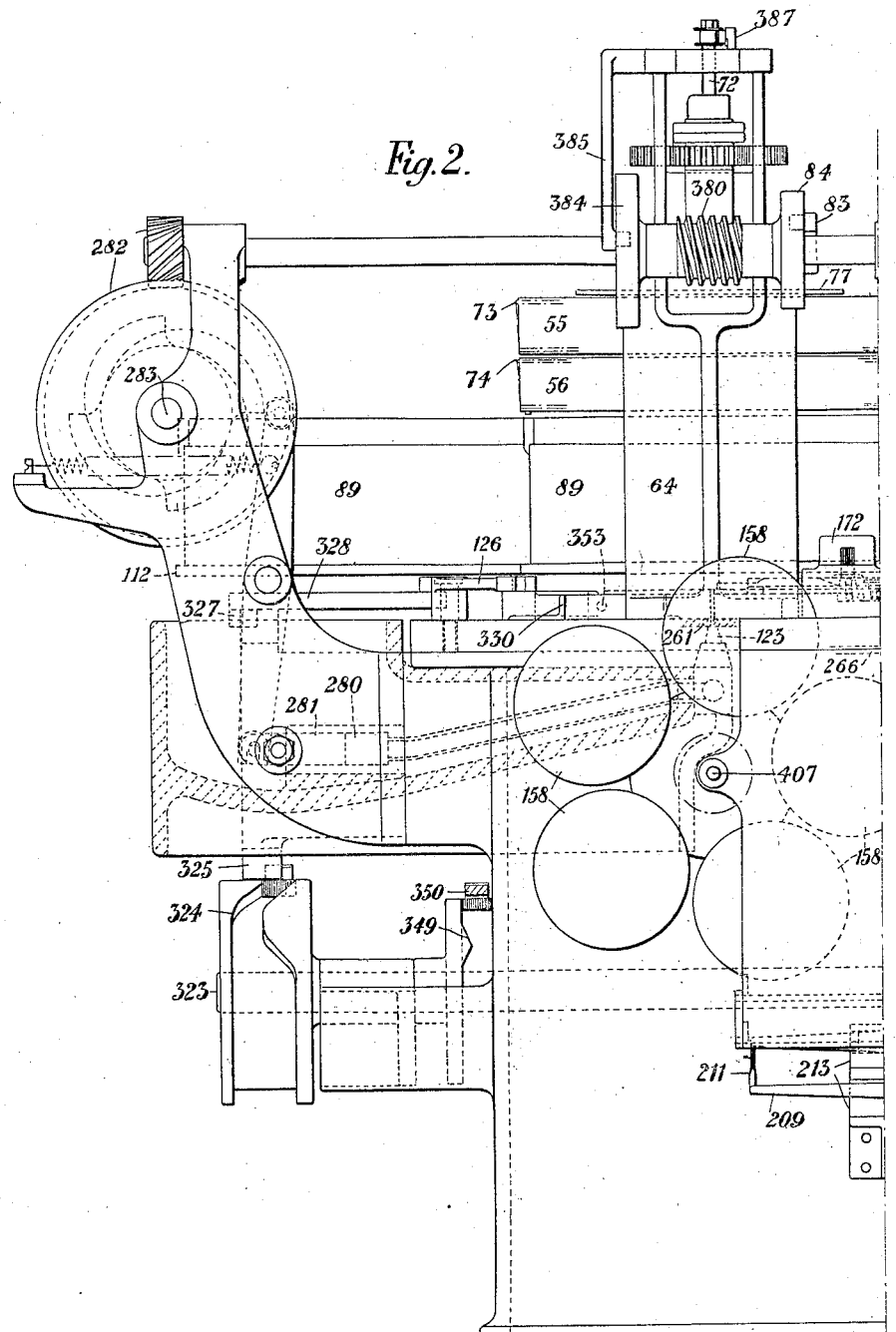

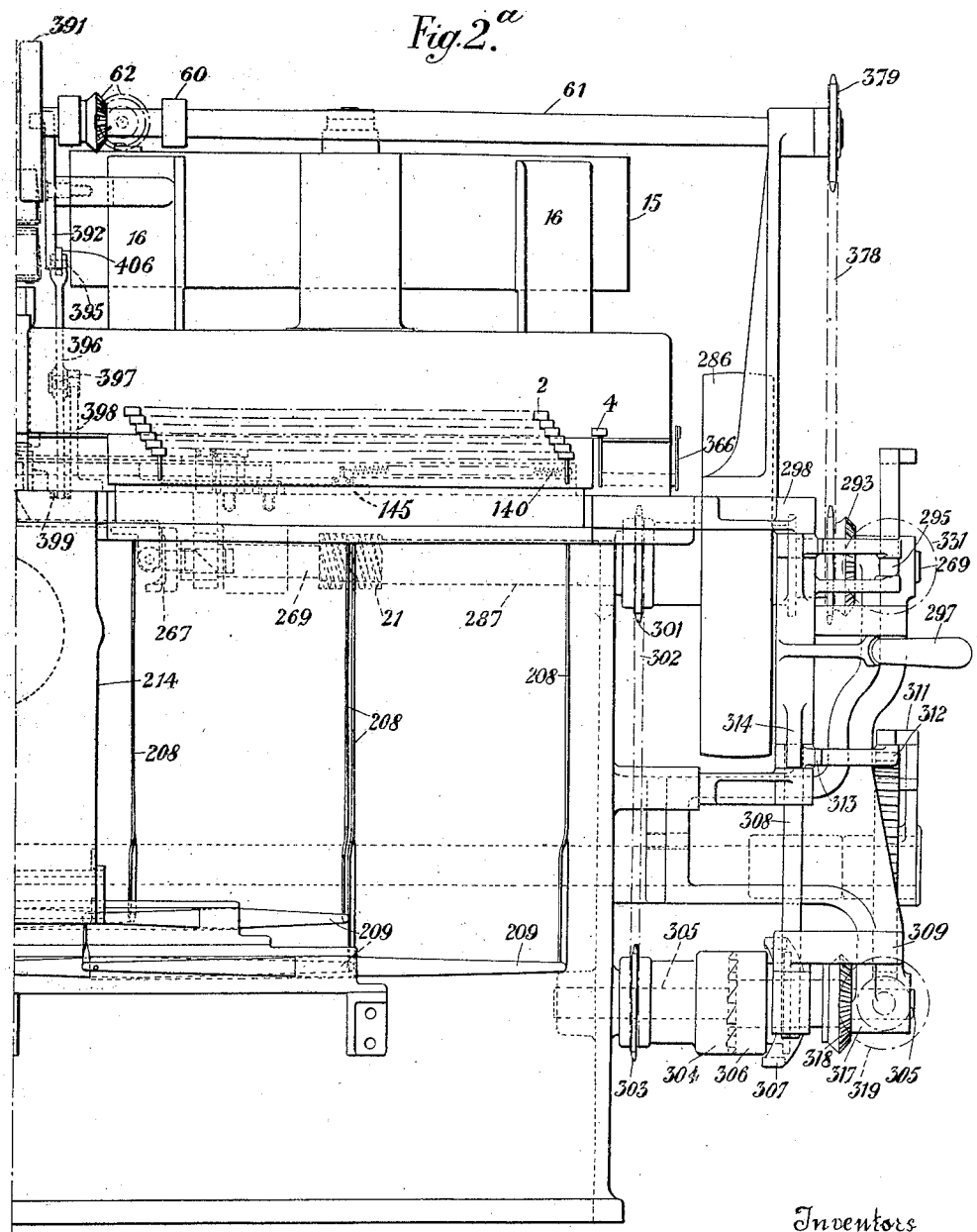

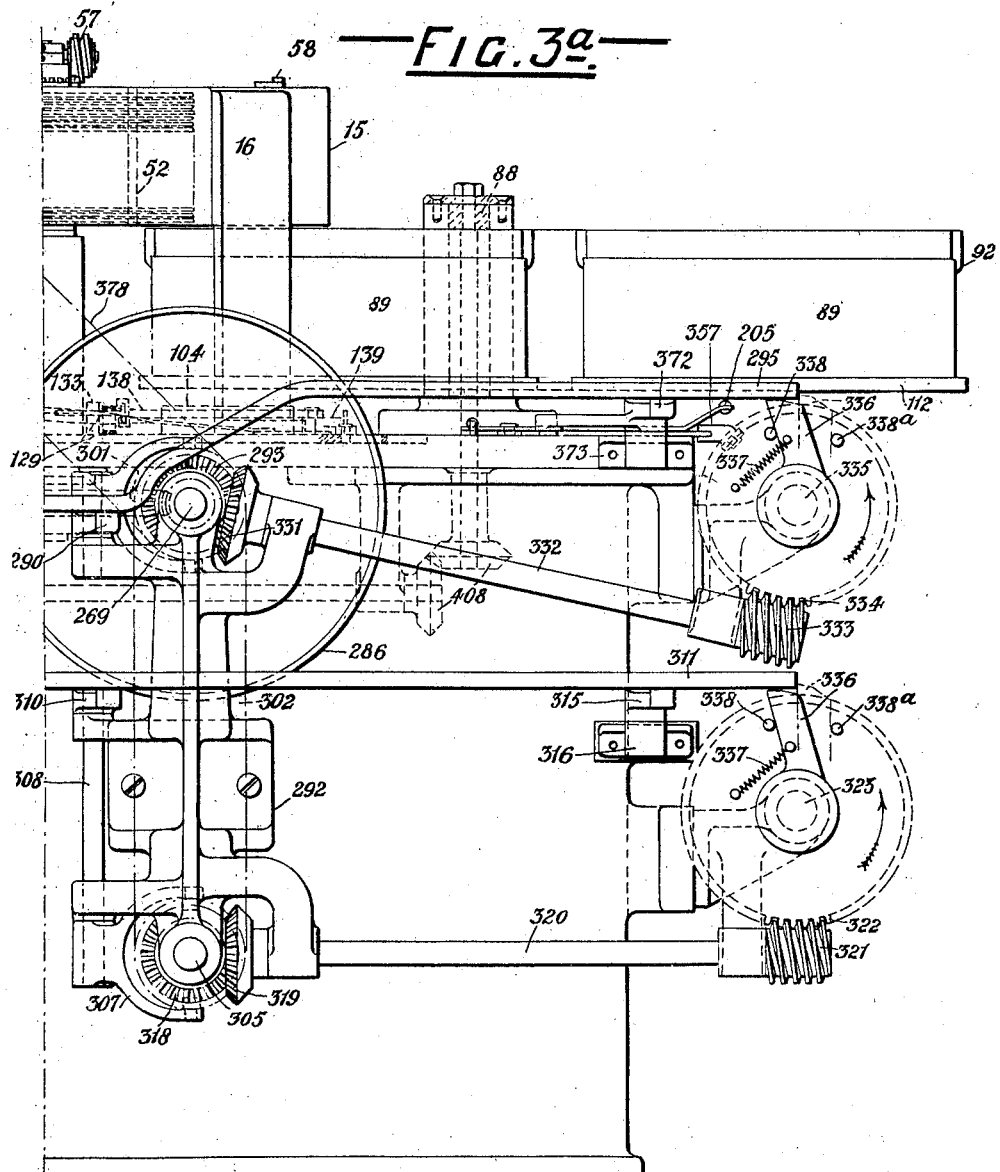

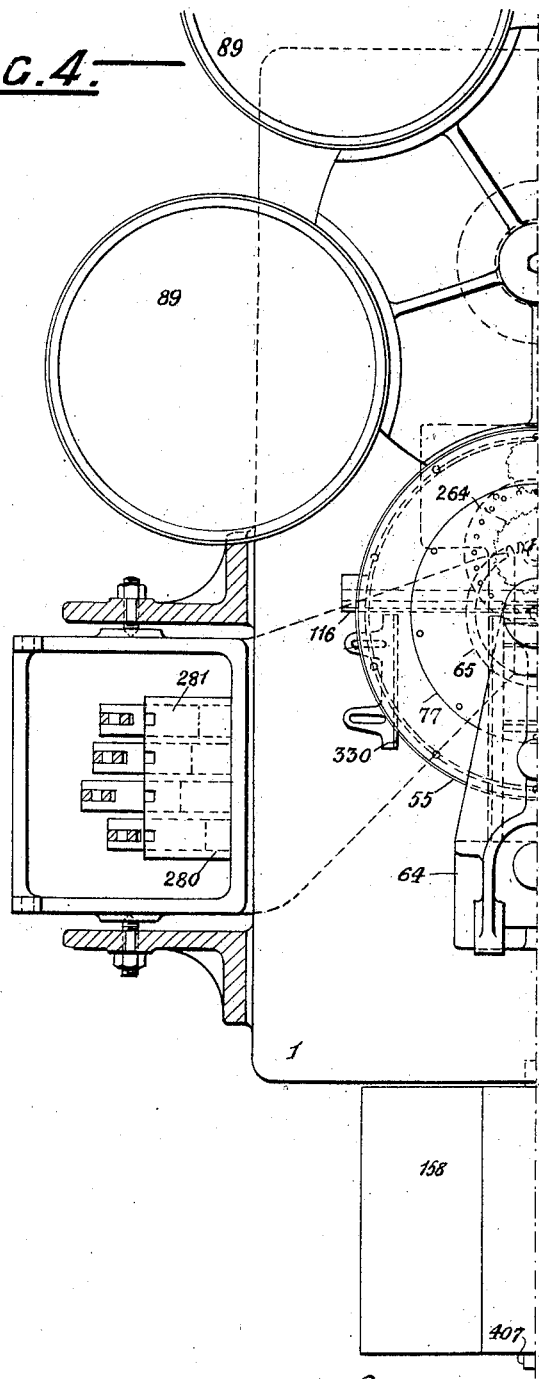

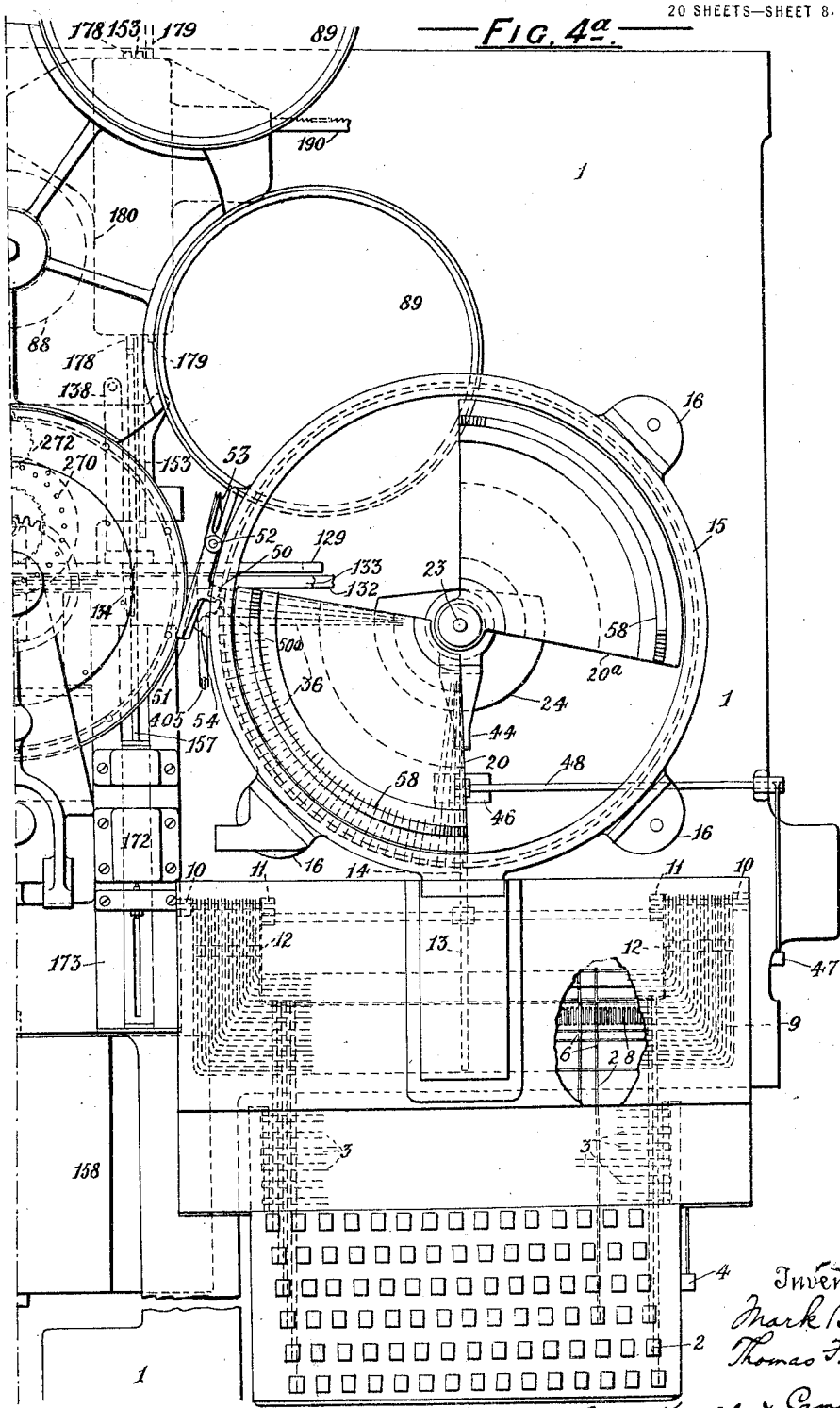

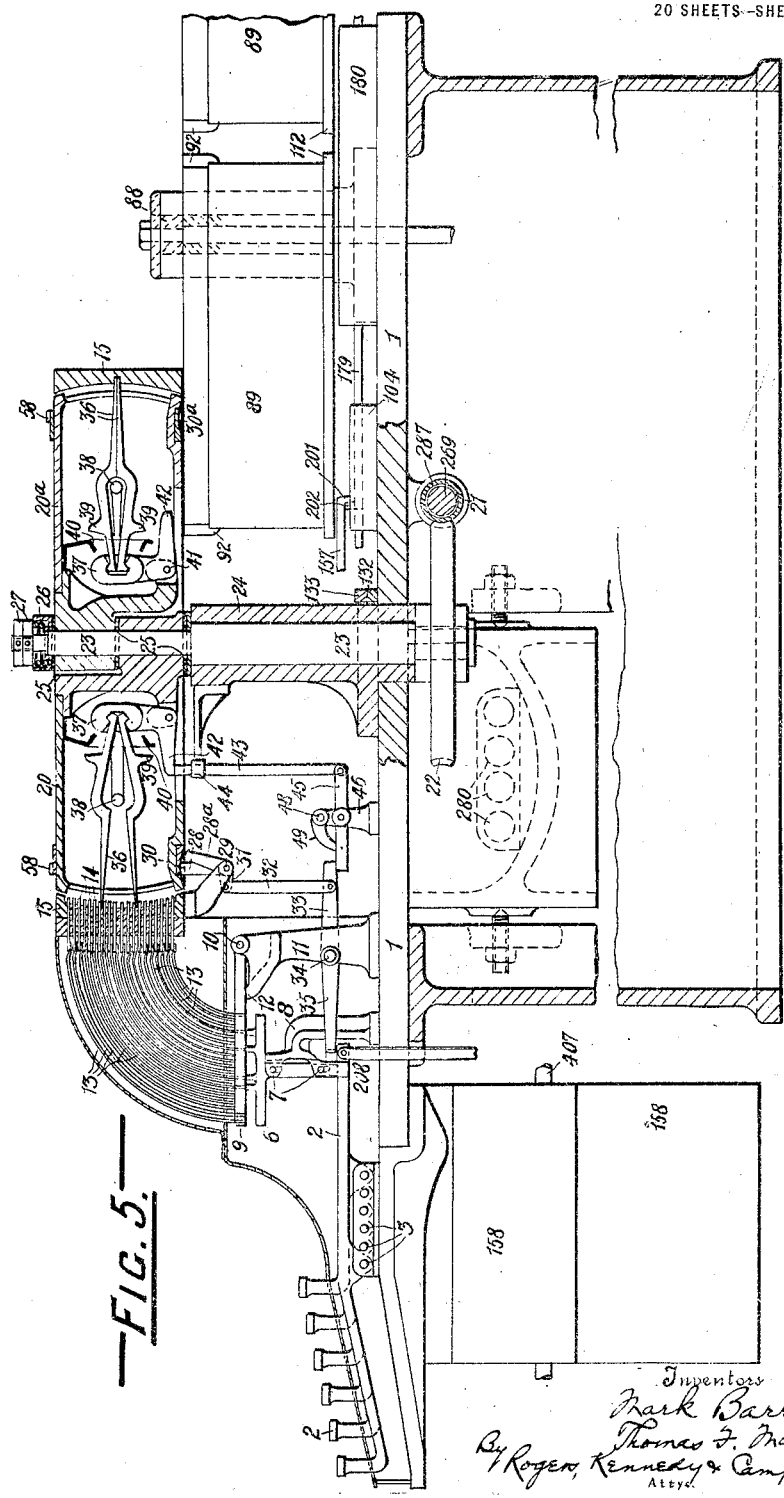

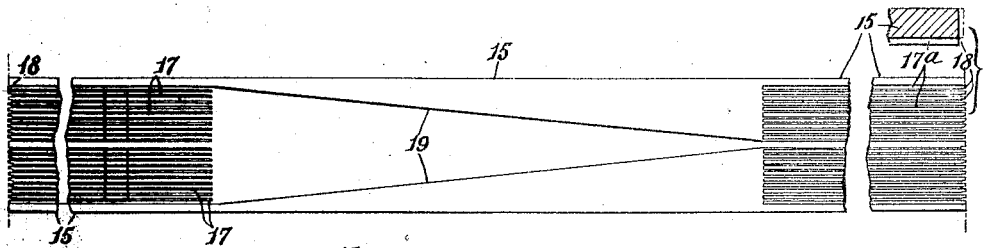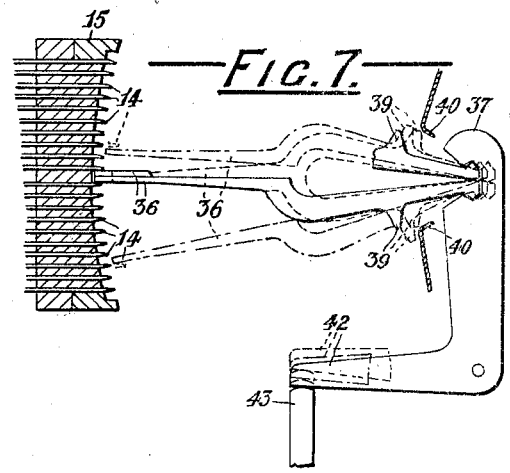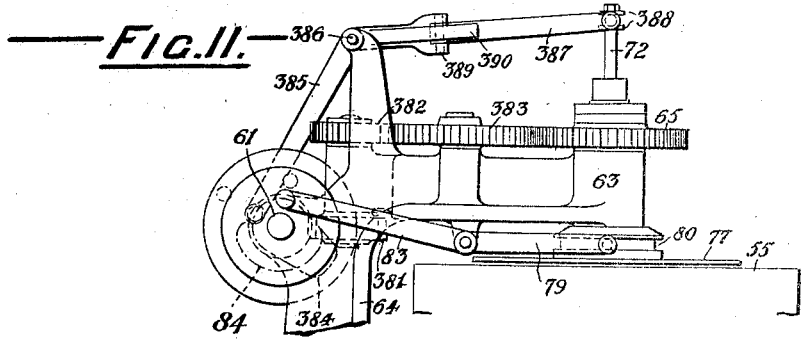

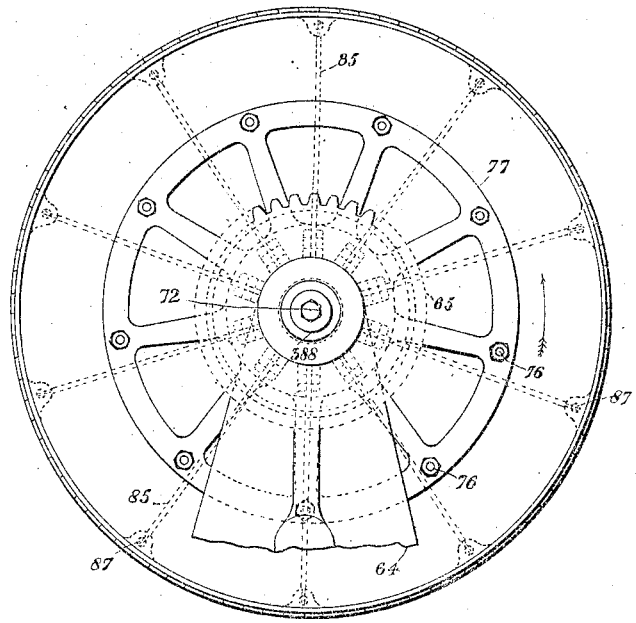
Fig. 8.
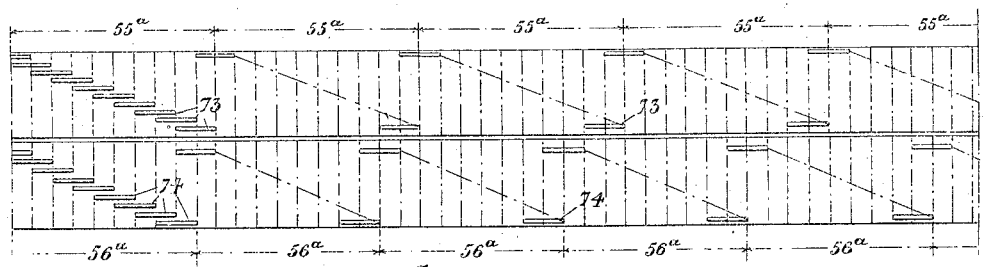
Fig. 10.
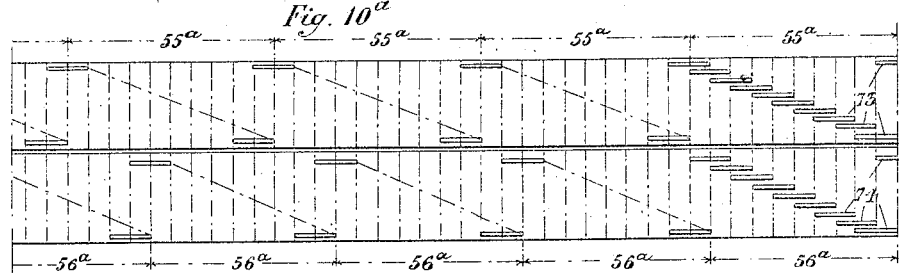
Fig. 10ᵃ

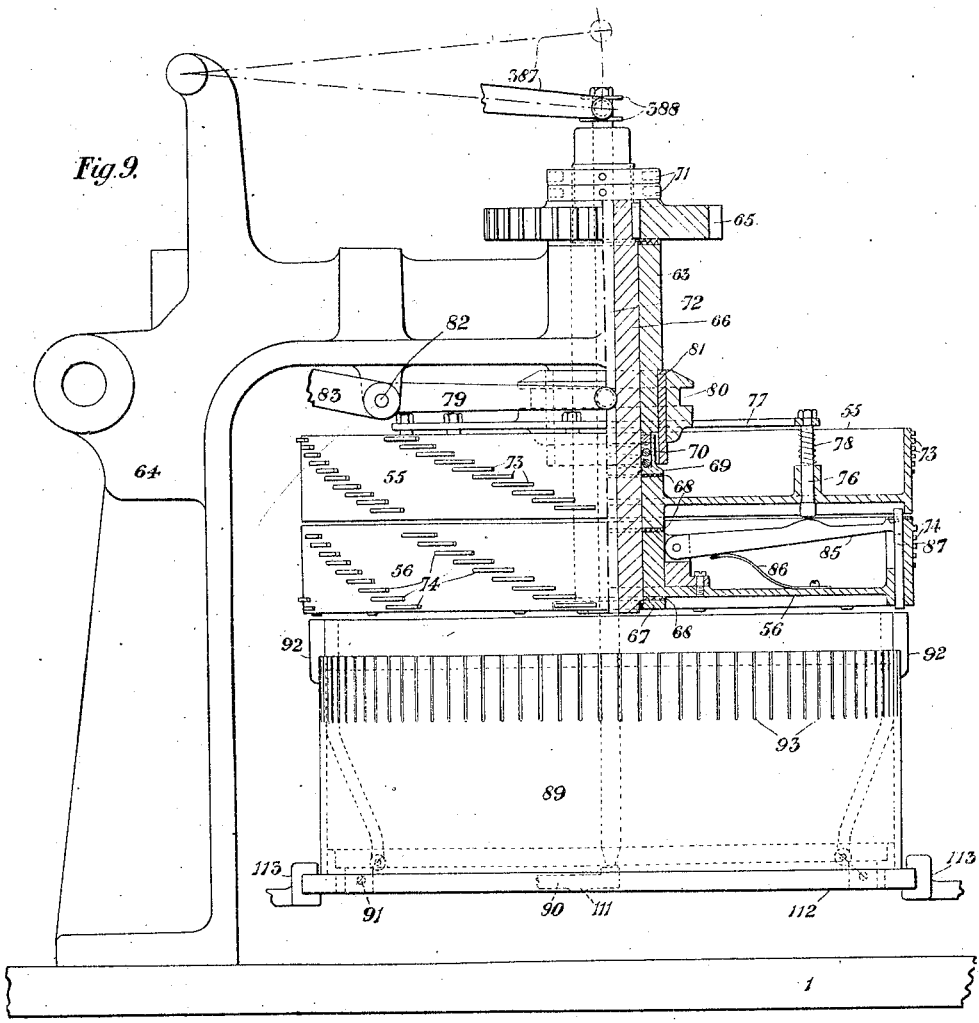

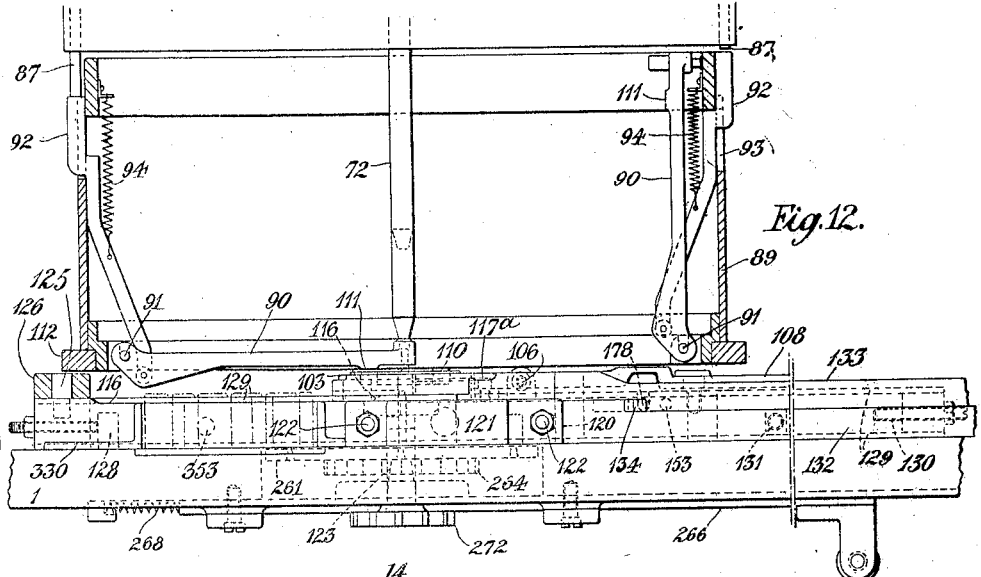
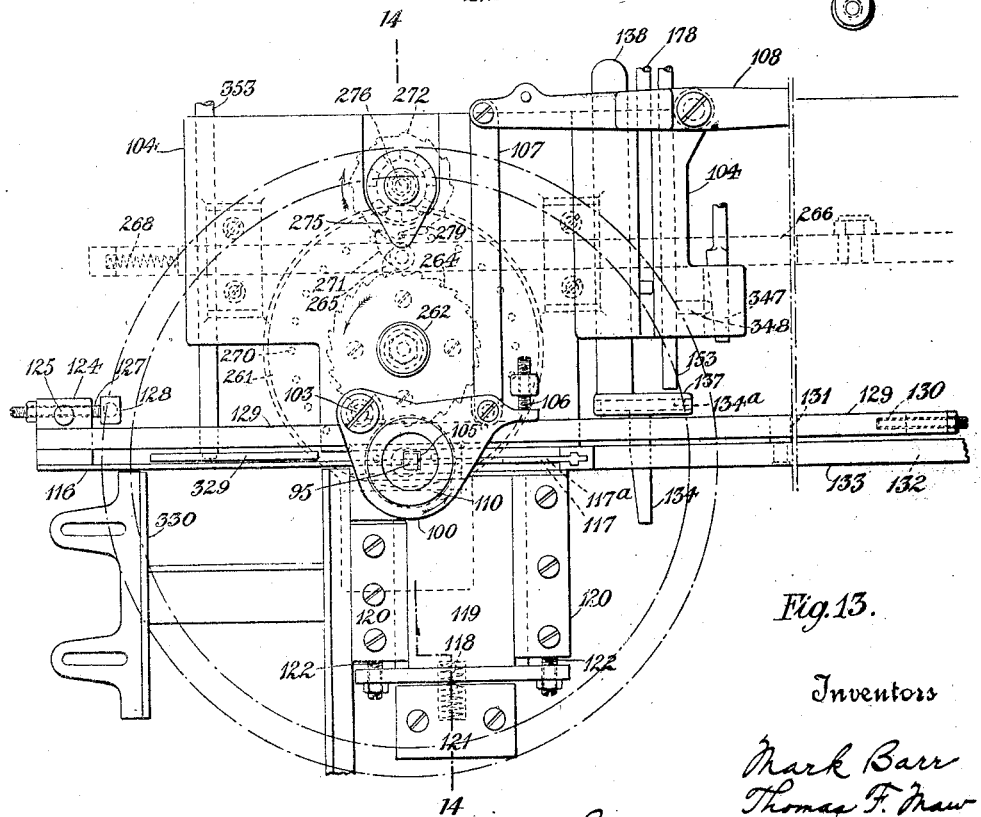

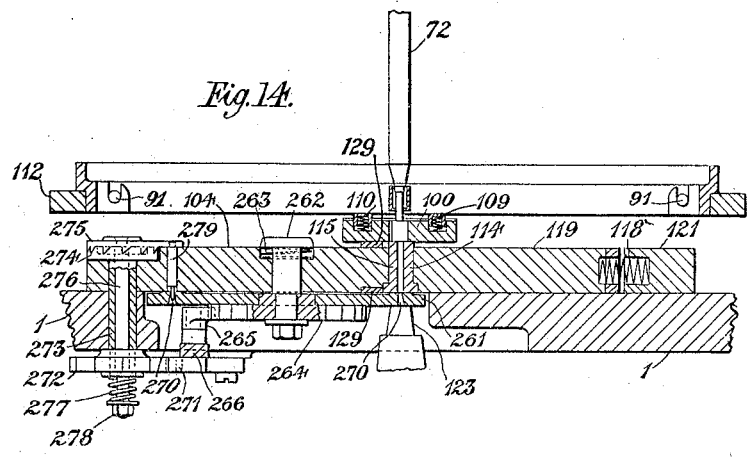
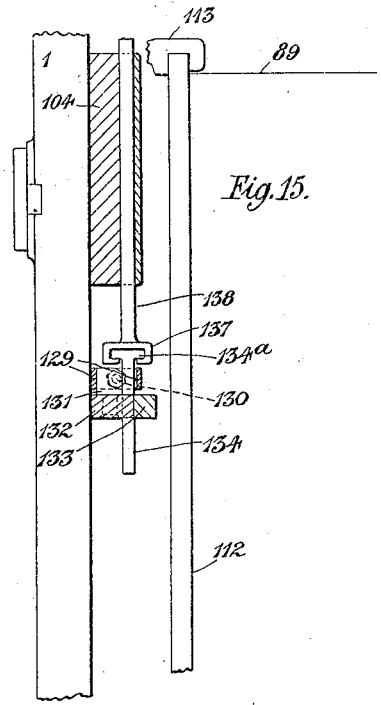

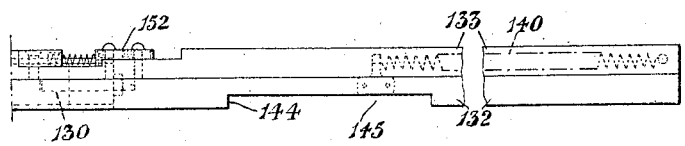
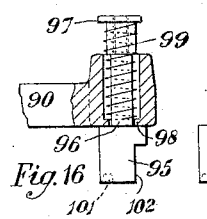
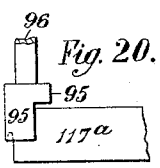
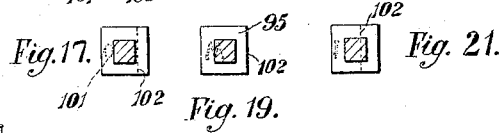
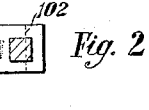
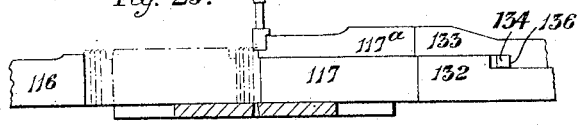
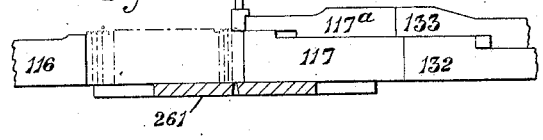
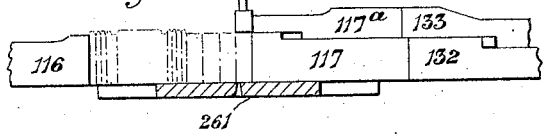
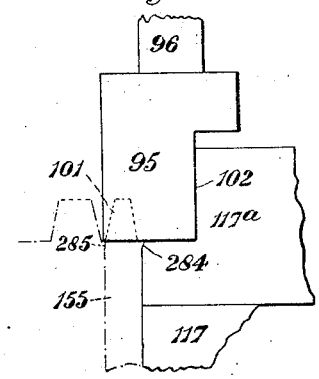

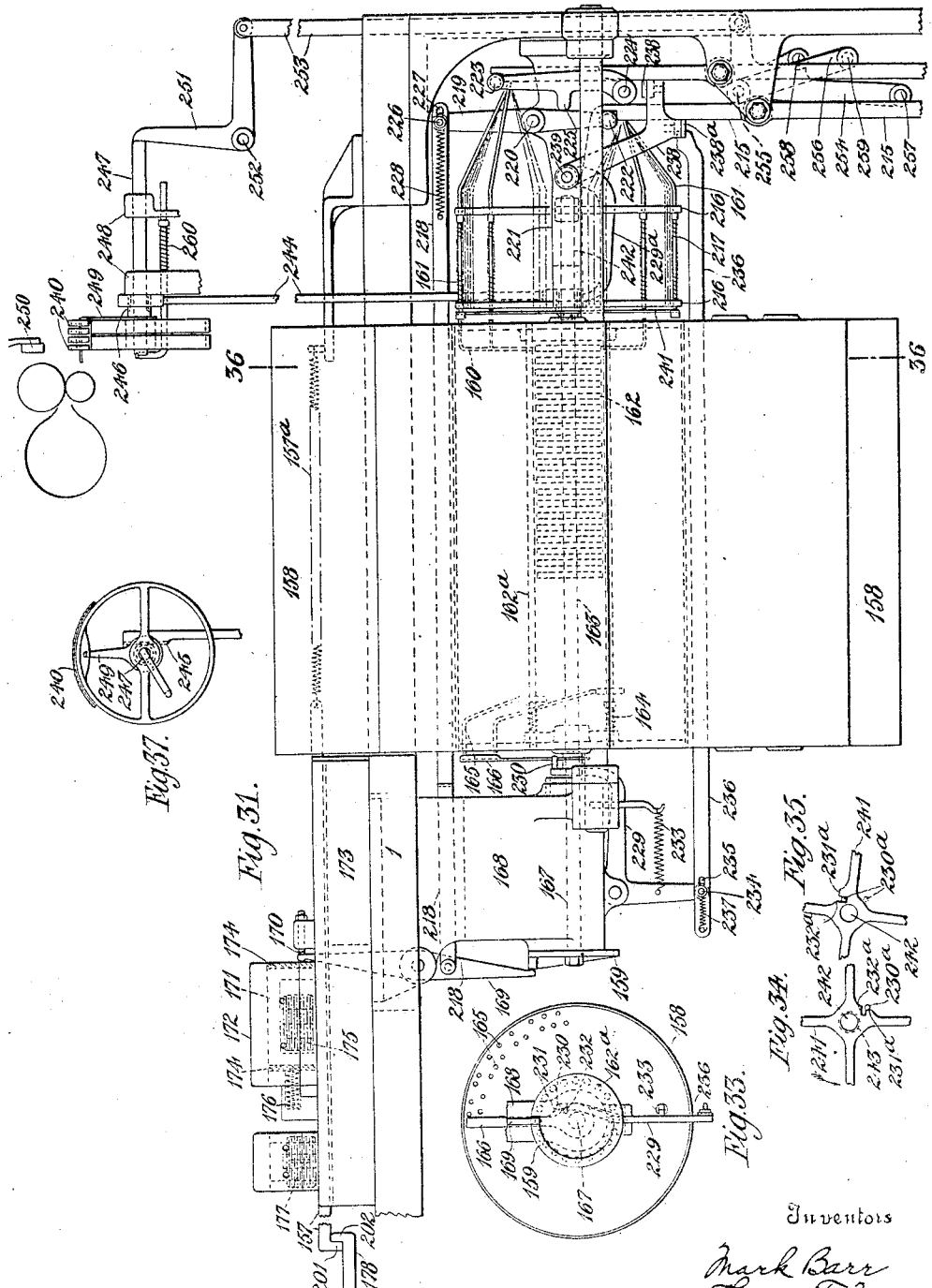

M. BARR AND T. F. MAW.
MECHANISM FOR COMPOSING AND CASTING TYPOGRAPHICAL MATTER.
APPLICATION FILED MAY 12, 1917.
1,380,763.
Patented June 7, 1921.
20 SHEETS—SHEET 18.
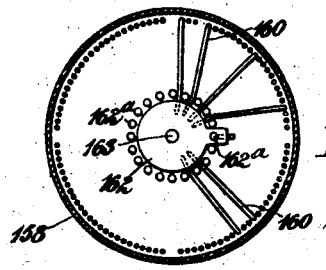
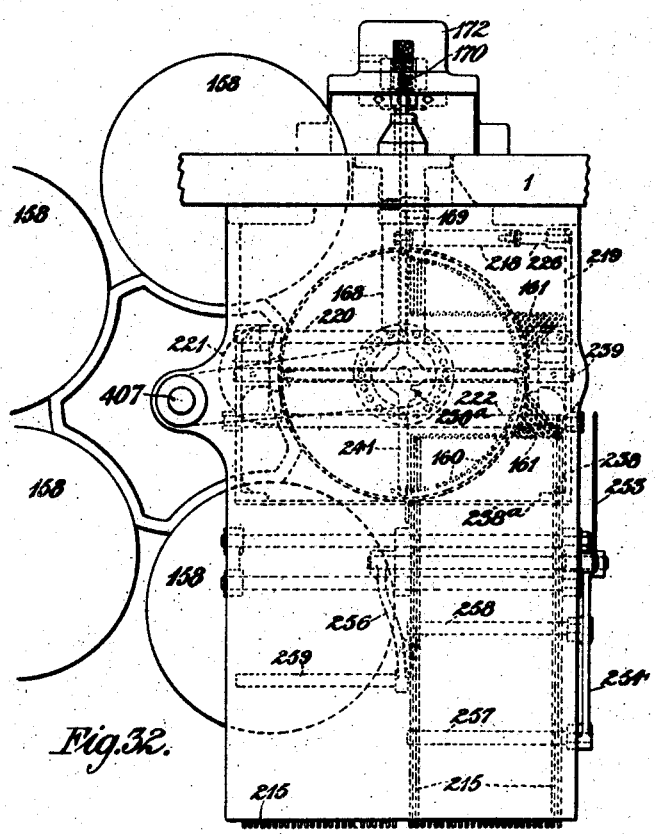

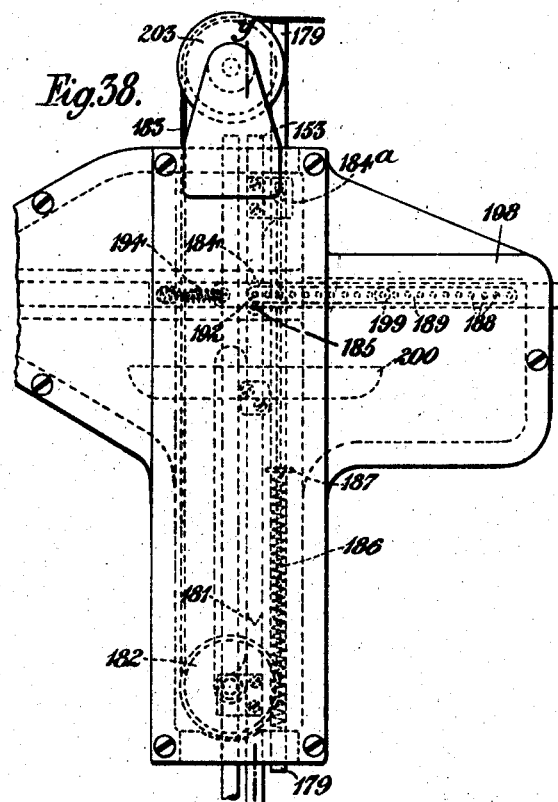
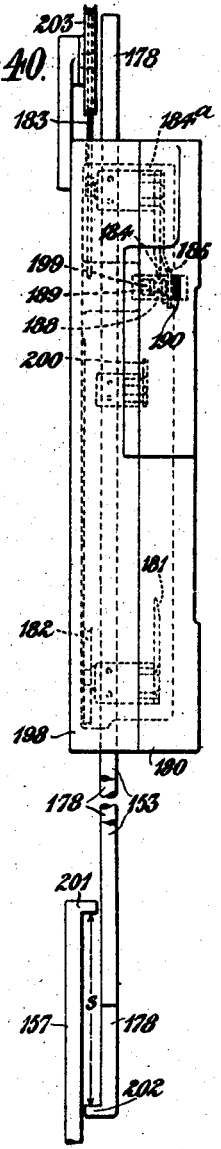
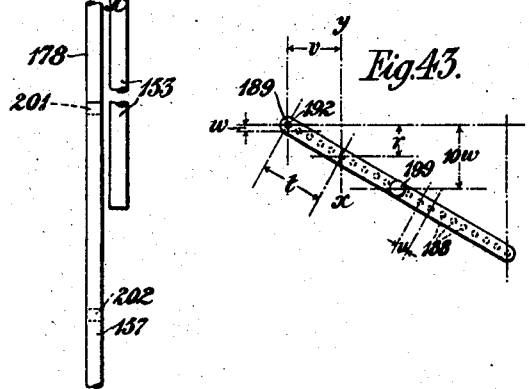
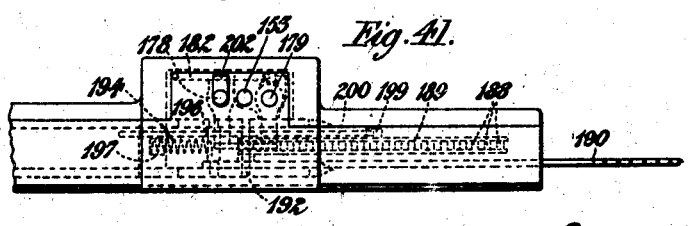

M. BARR AND T. F. MAW.
MECHANISM FOR COMPOSING AND CASTING TYPOGRAPHICAL MATTER.
APPLICATION FILED MAY 12, 1917.
1,380,763.
Patented June 7, 1921.
20 SHEETS—SHEET 20.
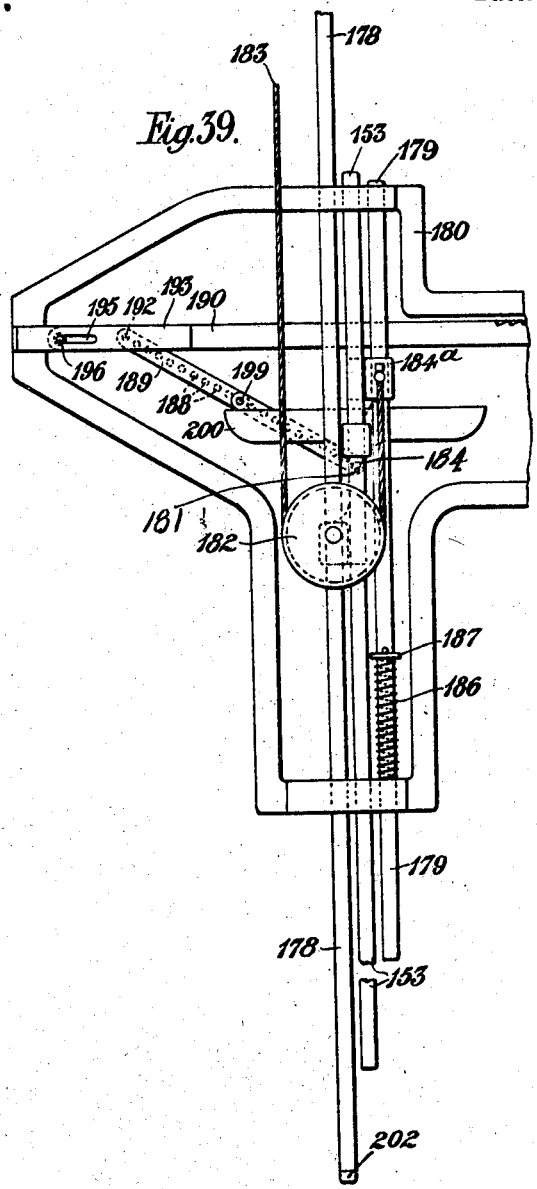
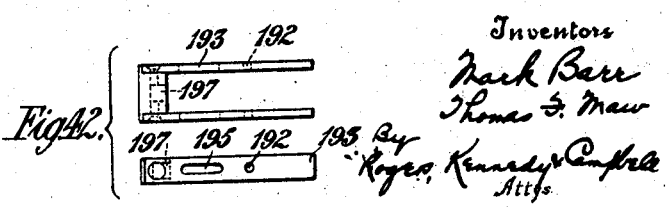

UNITED STATES PATENT OFFICE.

MARK BARR, OF CHELSEA, AND THOMAS FREDERICK MAW, OF CRICKLEWOOD, ENGLAND, ASSIGNORS TO MERGENTHALER LINOTYPE COMPANY, A CORPORATION OF NEW YORK.

MECHANISM FOR COMPOSING AND CASTING TYPOGRAPHICAL MATTER.

1,380,763. Specification of Letters Patent. Patented June 7, 1921.

Application filed May 12, 1917. Serial No. 168,033.

*To all whom it may concern:*

Be it known that we, MARK BARR, a citizen of the United States of America, and THOMAS FREDERICK MAW, a subject of the King of Great Britain and Ireland, residing, respectively, at 135 Church street, Chelsea, and at 43 Sneyd road, Cricklewood, both in the county of Middlesex, England, have invented new and useful Improvements in Mechanism for Composing and Casting Typographical Matter, of which the following is a specification.

This invention relates to mechanism for composing and casting typographical matter, and it is especially applicable, although not necessarily restricted, to the production of matter in the form of lines of separable type cast individually in the order of composition.

According to said invention the bodies of all the types of a line other than the first or leading type thereof, are cast in a mold of which the leading side or wall is constituted by the type next preceding it in that line, the latter being gradually built up of newly-cast types until the end is reached, when the said line is moved as a whole from casting position for association or setting-up with other lines similarly cast, ejection from the casting mechanism taking place only when the line is completed; an additional and important feature of the invention resides in the fact that the spaces necessary to justify the line to the predetermined measure are cast as parts of the type where those spaces are to appear in the printed line, and are as nearly as possible mathematically exact without reference to sizes which are commensurable.

Experiment has shown that the casting of one type body say A, in direct contact with a previously cast one, say B, does not cause any fusion of B so that there is no corporate bond between any two such contiguous type bodies, hence a line made up, as according to the present invention, of a number of similarly cast bodies, remains to the end, a line of separable type any of which, for correctional or other purposes, can be removed without materially disturbing the others.

The invention imposes no restriction on the actual formation or shape of the type bodies which may either be of uniform thickness throughout their height or have shallow recesses and projections on respectively opposite sides so that each body will be keyed to its immediate neighbor or neighbors.

For the production of composed lines of type as above mentioned, a machine in accordance with the present invention provides means by which an operator, through a key-board (with or without the use of a perforated control strip as an intermediary element) can set up in a so-called receiver, a series of combinations each representative of a character, or space of the composed line, so that these associated combinations when completed will be exactly symbolic of the locus of the different characters and spaces of the line and quite irrespective of the set-width dimension of either the characters or the spaces.

The casting of the first character of each line takes place within a mold consisting of four vertical walls of which preferably the two extending in set-wise direction, for each given size or font of type, are practically immovable, though external pressure to one of them is capable of being periodically relieved to facilitate removal of the cast type; the two other walls forming respectively the leading and following surfaces of the type body are relatively movable, and the last named one is moreover itself composed of two superimposed and relatively adjustable parts hereinafter termed "blades." The mold is completed at its lower end by a pump nozzle which injects molten type metal thereinto through a jet plate which is rotatable for shearing off the jets or tangs of the types, and at its upper end, by any one of a series of matrices, say 90, which, as hereinafter described, can be presented in casting position one at a time in order of composition. The casting of each character other than the first of a line, takes place in a mold similar to the above in all respects excepting that the leading wall of that mold is constituted by the rear or following surface of the type body last previously cast.

For convenience of description, the parts of the mold forming the leading and following surface of the type body, are herein termed respectively the front liner and the rear liner, the latter of which is made up of the before mentioned upper and lower blades.

The casting face of the front liner is initially positioned to the first set edge of type by an adjustable stop device which prevents that liner moving in anti-setwise direction beyond that position, and the casting face of the rear liner is likewise initially positioned to the same set edge so that it abuts against the opposed face of the front liner.

The two mold blades constituting the rear liner are capable of being moved away from the front liner, the movement of the lower one being limited, as a determining factor of the length of the line, by an adjustable stop.

The matrices in the form of rectangular blocks are carried in the swinging ends of levers wherein they have freedom of movement to allow them, when in casting position, to be alined by a so-called squeeze frame, which is moved against a suitable abutment, and at the same time, the matrix then in casting position, is held down in contact with the mold by a vertically reciprocating plunger.

The movement of the lower mold blade relatively to the upper one is permitted by a wedge longitudinally movable between the two, said wedge being slidably attached to its operating head so that it can move in set-wise direction along with the two blades, and the upper blade is limited in its setwise or leftward movement by the matrix with which it contacts.

The metal pump is preferably provided with a plurality of cylinders, the plungers of which are operated in rotation so as to deliver jets of molten metal at the same rate as that at which the matrices are presented in casting position.

After each casting operation, the squeeze-frame is released, the respective matrix returns to normal position and the lower mold blade is moved in set-wise direction to bring its face to the position of the above-named first set edge and correspondingly moving the last-cast type to the same extent; the before mentioned spring pressure on the respective mold wall having previously been relieved to facilitate this last-named movement.

The withdrawing movement of the wedge is limited according to the position of a justification rod, and the casting faces of the two mold blades are thereby correspondingly brought more or less out of coincidence to allow for the casting of a wider or narrower space on the type body next to be produced.

Before the last type of the line is cast, the lower mold blade is allowed to move outward to the before-mentioned adjustable stop so as to insure that this type will exactly fill out the line to the absolute lock-up length independently of space or set errors, and the upper part of this last type, which would be above chase height and would correspond with the upper mold blade, may or may not slightly exceed this lock-up length according to the then relative positions of the lower and upper mold blades.

After the line has been thus completed, it is pushed clear of the mold in set-wise direction and then laterally into a galley.

The invention will now be more particularly described by reference to the accompanying drawings which represent, as an example, one manner in which said invention can be carried out, and which are to be taken as part of this specification and read therewith.

In these drawings:—

Figure 1 is the left-hand part and Fig. 1ª the right-hand part of a plan of a machine embodying the said invention with certain parts shown in section and other parts, for convenience of illustration, omitted or shown diagrammatically; the bottom of these figures at which the keyboard is located, is regarded as the front of the machine;

Fig. 1ᵇ is a view partly in elevation and partly in section as viewed from the right-hand side of Figs. 1 and 1ª, showing certain of the devices for operating the mold blades;

Fig. 2 is the left-hand part and Fig. 2ª the right-hand part of a front elevation of the machine;

Fig. 3 is the left-hand part and Fig. 3ª the right-hand part of an elevation of the right-hand side of the machine, that is to say, as viewed from the right of Figs. 1 and 1ª;

Fig. 4 is the left-hand part and Fig. 4ª the right-hand part of a plan of the principal organs of the machine minus the operating mechanism thereof;

Fig. 5 is a vertical section extending fore and aft of the machine and taken through the center of the key-board and the center of the receiver drum;

Fig. 6 is a development, partly broken away, showing the grooves formed on the inner side of the wall of the receiver drum;

Fig. 7 is an enlarged view of a part of Fig. 5;

Fig. 8 is a plan of the matrix-selector drums and certain parts adjacent thereto;

Fig. 9 is a view partly in elevation and partly in vertical section corresponding to Fig. 8 and showing beneath the matrix-selector drums one of the magazines in operative relationship thereto;

Fig. 10 is the left-hand part and Fig. 10ª the right-hand part of a development showing diagrammatically the arrangement of the stops around the circumference of the two matrix selector drums;

Fig. 11 is a right-hand side elevation of the mechanism for rotating the matrix selector drums and actuating the matrices;

Fig. 12 is a vertical section through one of the matrix magazines;

Fig. 13 is a plan of a part of the machine showing the alining and justification mechanism, and other parts coöperating therewith;

Fig. 14 is a vertical section taken on line 14—14 of Fig. 13;

Fig. 15 is a vertical section of Fig. 13 showing the means for actuating the space wedge;

Fig. 16 is a sectional elevation and

Figure 22:
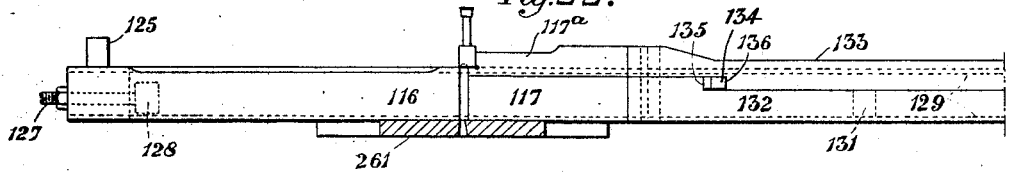

Fig. 17 a horizontal section illustrative of one of the matrices and the manner in which it is supported in the matrix lever;

Figs. 18 and 19, are views substantially similar to Figs. 16 and 17 respectively, of another of the matrices;

Figs. 20 and 21 are views similar to Figs. 18 and 19 but showing in Fig. 20 a portion of one of the mold blades;

Figs. 22 and 22ª are respectively the left-hand and right-hand parts of the same view, and Figs. 23, 24, 25, 26 and 27, are views partly in elevation and partly in vertical section showing the manner of operation of the mold blades;

Figs. 28 and 29 show modifications of the devices represented in Figs. 22 to 27 applied respectively to the forming of high spaces and to the forming of high quads;

Fig. 30 is an elevation somewhat similar to Fig. 20 showing a means of preventing the squirting of metal past the leading edge of the matrices;

Fig. 31 is an elevation as viewed from the left-hand side of the machine, showing the set-width cylinders and the devices operating conjointly therewith;

Fig. 32 is a front elevation of a part of the mechanism shown in Fig. 31;

Fig. 33 is a rear elevation of the mechanism for determining the movement of the helical cam operated by, or in connection with, the set-width cylinders;

Figs. 34 and 35 are elevations of a part of the mechanism for operating a typewriter or equivalent recording apparatus used in connection with the present invention;

Fig. 36 is a transverse vertical section through one of the set-width cylinders on or about the line 36—36 of Fig. 31;

Fig. 37 is a rear elevation showing a suitable manner of operating one of the type drums of the recording mechanism;

Fig. 38 is a plan of a part of the space-adder;

Fig. 39 is a plan similar to Fig. 38 with the cover removed;

Fig. 40 is a right-hand elevation of Fig. 38;

Fig. 41 is an elevation of the under-side of Fig. 38;

Fig. 42 comprises an elevation and a plan of a portion of the mechanism shown in Figs. 38 to 41; and Fig. 43 is a diagram illustrative of the manner of operation of a part of the space-adder.

Throughout the several figures of the drawings, which are drawn to various scales, like reference numerals are used to indicate the same or corresponding parts.

Key board.

It may facilitate the understanding of the mechanism if, at this stage, the fact is emphasized that the key-board exercises no direct control over the matrices, or the casting or delivering of the type and that its function is solely to enable the operator to set the machine, so that it shall automatically effect the presentation of the matrices in proper succession to the mold and cast the type, some with spaces integral therewith, to produce and deliver lines of separable type, all accurately justified to the same predetermined measure.

The key board represented best in Figs. 4ª and 5, is attached to the front of the machine frame table 1 and comprises a number of keys 2, say ninety as is usual in this class of machine, pivoted on rods 3, and each of these keys is representative of one of the type characters which can be cast by the machine. At the right-hand side of the key board as shown in Figs. 1ª and 4ª, or in other convenient position, is located the space key 4, pivoted upon a stud 5, Fig. 3. The rear end of each of the keys 2 as shown in dotted lines in Fig. 5, underlies the vertical stem of a two-pronged fork 6 movable vertically on guide pins 7 fast to a stationary bracket or standard 8, the guide pins traversing slots formed in the said stems, and the bracket serving also to guide the rear ends of the keys all as shown in Fig. 5. The fork-prongs appertaining to different keys 2, occupy respectively different positions so that each of said keys is represented by a different combination of prongs, which latter may be disposed symmetrically relatively to a given median plane, as shown in Fig. 5 in connection with the fork nearest the observer, or unsymmetrically as shown in that figure in connection with a fork more remote from the observer; to avoid undesirable complications of Figs. 4ª and 5, only two of the forks 6, (the same ones in both figures) are shown therein.

Above the ninety forks 6, there are located twenty bails 9 nested one inside another as shown in Fig. 4ª, and all capable of turning independently about the same co-axial pivots 10 supported in fixed standards 11 which latter are provided with rails 12 to support the bails 9 in normal position, as shown best in Fig. 5. To the front or cross member of each of the bails 9, there is attached one end of a curved resilient rod 13 whose other end is attached to a tongue 14 capable of sliding through the annular wall of the receiver drum 15 which is rigidly secured to the table 1 by feet 16 Fig. 4ª. Each of the bails 9 traverses the path of the prongs of one or more of the forks 6 so that when one of said forks is raised by the depression of the key 2 appertaining thereto, the two bails 9 which overlie the prongs of that fork will be swung upward and the two tongues 14 resiliently attached to those bails will be projected farther into the interior of the receiver drum 15.

The interior surface of the receiver drum 15, as shown in Fig. 6, is provided with two series of parallel horizontal grooves 17, 17ᵃ extending partly around the same, the grooves 17 being separated from the grooves 17ᵃ at one part by a vertical groove 18 where the tongues 14 virtually serve to maintain their continuity, and at another part by a taper groove 19 embracing at its entrance end all the grooves 17 and tapering down until at the opposite end it connects with only the central one of the grooves 17ᵃ.

Within the receiver drum 15 two sectors 20, 20ᵃ constituting the receiver proper, are frictionally rotated from a worm 21 and worm wheel 22 (Fig. 5) the latter fast to a vertical shaft 23 capable of rotating within a bearing 24 concentric with the drum 15 and fast to the table 1. The upper reduced end of the shaft 23 penetrates the bosses of the two sectors 20, 20ᵃ, and when this shaft is rotated, it constantly tends to carry the sectors with it by friction exerted on said bosses through friction washers 25 under pressure of a spring 26 Fig. 5, which pressure can be adjusted by nuts 27 threaded on the extreme upper end of the shaft 23.

The just-named rotation of the sectors 20, 20ᵃ by the shaft 23, is controlled by escapement pawls 28, 28ᵃ rocking as one piece about a stationary pivot 29 and adapted respectively to engage successive teeth of a segmental rack 30 or 30ᵃ fast to the underside of the sector 20 or 20ᵃ respectively, this arrangement serving to allow the particular sector which is then controlled by the escapement, to be moved with the shaft 23 to the extent of one tooth of the rack 30 or 30ᵃ at each complete oscillation of the pawls 28, 28ᵃ. These pawls are rigidly connected with a lever arm 31 to which is pivoted the upper end of a link 32 whose lower end is pivoted to a lever arm 33. This lever arm is fast to a rocking shaft 34 on which is fixed a bail 35 whose front member overlies the rear ends of all the keys 2, as shown in Figs. 4ᵃ and 5, so that when any of such keys is depressed, the tongues 14 appropriate thereto, are projected, as before described and as shown in Fig. 7, and the escapement 28, 28ᵃ is rocked to allow the respective sector 20 or 20ᵃ to move around to the extent of one tooth of the respective rack 30 or 30ᵃ.

Each sector 20, 20ᵃ carries a series of pairs of calipers 36, radially disposed around the shaft 23, the heel ends of each pair, that is to say, the end nearer the said shaft, being held, with a capacity for pivotal motion, in a housing 37; in Fig. 5 there are shown only two pairs of the calipers viz:—one pair of each of the sectors 20, 20ᵃ, but in Fig. 4ᵃ the complete series appertaining to the sector 20, is diagrammatically represented by dotted lines, it being here explained, that the number of pairs of calipers in each of the sectors is equal to the maximum number of characters which can be set up in any one line of matter to be composed.

The members of the respective pairs of calipers 36, are normally constrained to separate under the action of springs 38, and those members are each formed with outwardly-directed horns 39 adapted to engage abutments or cams 40 fast to the sectors 20, 20ᵃ, when the calipers are withdrawn sufficiently for that purpose, as hereinafter more fully explained.

Each of the housings 37 (of which there is one for each pair of calipers 36) is free to rock in a vertical plane, independently of all the others, as shown for example in Fig. 7, on a pivot 41, fast in the respective sector 20, 20ᵃ, and moreover, is provided with an arm 42, extending radially outward toward the receiver drum 15. During the rotation of the sectors 20, 20ᵃ the outer ends of the arms 42 are successively brought over and into operative connection with the upper end of a vertical push rod 43 which is slidably guided near this end in a guide 44. The lower end of the push rod 43, is pivoted to the rear end of a lever 45 fulcrumed in a fixed standard 46, and whose forward end underlies the rear end of the before-described lever arm 33. When, therefore, any one of the keys 2 is depressed, the particular pair of calipers 36 which is then radially alined with the vertical groove 18, will, through its housing 37, be withdrawn rearward, as shown in chain lines in Fig. 7, to an extent sufficient to disengage their outer ends from the two innermost tongues 14 and allow those calipers to open outward until stopped by the two tongues which had been moved rearward by the same key depression as that which caused the withdrawal rearward of the calipers in question. When the key is released, the withdrawn pair of calipers, under the action of a spring or equivalent not shown in the drawings, is moved forward along with the two projected tongues with which its ends are then in engagement so that those ends on completion of such forward movement, will be in position to enter two of the grooves 17 when the calipers are propelled by the immediately ensuing angular movement of the respective sector 20, or 20ᵃ. According to the before-mentioned symmetrical or unsymmetrical disposition of the prongs of the forks 6, so will be the disposition of the grooves 17 engaged by the two legs of each pair of calipers, in other words, so will those legs be caused to enter grooves symmetrically or unsymmetrically disposed relatively to the horizontal median plane of the receiver drum 15.

*Means for Correction of Errors.*

For enabling errors of setting to be corrected, provision is made for returning the calipers 36 into radial alinement with the tongues 14, and when a pair of calipers is thus alined and the corresponding lever arm 42 is once again above the push rod 43, they can be withdrawn to an abnormal extent, as shown for example in dotted lines in Fig. 7, by depressing a correction key 47, Figs. 1ª, 3 and 4ª, fast on a horizontal rock shaft 48 on which also is fast an arm 49 adapted to bear on the forward arm of the lever 45. This abnormal withdrawal of the particular pair of calipers in question, besides disengaging the ends of those calipers from the tongues 14 (as when normally withdrawn) brings the caliper horns 39 thereof into engagement with the cams 40 and thus, as shown in dotted lines (as distinguished from chain lines) in Fig. 7, closes the said calipers, and, at that stage, the proper character key 2, is depressed so as to protrude the respective tongues 14, and the correction key is then released so as to allow the calipers as shown in chain lines in Fig. 7, to engage with those tongues and thereby enable said calipers to enter the grooves 17 appropriate to those tongues. During this correcting operation, those of calipers which are moved rearward of the vertical groove 18 enter their proper grooves of the set 17ª, those grooves retaining them in position until they are again moved into their respective grooves of the set 17.

Near the exit ends of the grooves 17, the wall of the receiver drum 15 is penetrated by the cams or heels 50, 50ª, Fig. 4ª, of a series of superposed stop and space-control levers 51, 404, all co-axially pivoted to the outside of the drum 15 by a pivot pin 52, the space-control lever 404, being lowermost. Each of the levers 51, 404, is acted upon by a blade spring 53 which normally holds its forward end in contact with a fixed stop 54, (the stop for the lever 404 is not shown) and its cam 50, 50ª, in the path of the end of one of the caliper legs so that as the calipers pursue their angular movement about the axis of the vertical shaft 23, the cams 50, 50ª will be engaged by them, and the respective levers 51, 404 will be swung leftward, the stop levers 51 being thus moved into the path of a series of stops grouped in step-wise arrangement about the peripheries of the two matrix-selector drums 55, 56, Figs. 8 and 9, and the lever 404 being thus moved out of the path of a rod 393 as hereinafter more particularly described.

Shortly after engaging with the cams 50, 50ª, the calipers 36 leave the groove 17 and enter the larger end of the taper groove 19 which, by the further angular movement of the calipers serves to press the outer ends of the latter toward each other and conduct them all into the central one of the grooves 17ª.

The sectors 20, 20ª remain under the control of the keyboard during their travel in the direction indicated by the arrow in Fig. 1ª, through an angle of slightly more than ninety degrees, and when either of them, say for example the sector 20, leaves that control, it arrives at a position in which it can be controlled by a worm 57, Figs. 1ª and 3ª, when that worm is started in operation for the casting of the line then represented by the calipers in that sector. When the worm 57 is so operated, it engages with the leading tooth of a curved rack 58 fast to the top of said sector, and carries the latter around in advance of the sector 20ª through a second angle of corresponding dimension. By these means the sectors 20, 20ª are positively propelled during the periods that their calipers are actuating the stop levers 51, without adding that work to the friction drive devices by which the following sector 20ª in the example above given, or 20, is then being propelled. The worm 57 is rigidly secured to a shaft 59 journaled in a bearing 60 which, as shown best in Fig. 1ª, is swiveled on a horizontal shaft 61 so that the said worm can, when necessary, be lifted out of engagement with the racks 58. The worm shaft 59 is in constant rotative connection with the horizontal shaft 61 through a pair of miter gears 62.

*Matrix-selector drums.*

The matrix-selector drums 55, 56 illustrated in detail in Figs. 8, 9, 10 and 10ª are coaxially mounted in the vertical boss 63 of an overhanging bracket 64 fast to the table 1, and they are capable of being frictionally rotated by a toothed pinion 65 and a vertical tubular shaft 66, on which latter the said pinion is secured with a capacity for slight axial motion (but not angular motion) thereon. On the lower end of the shaft 66 is rigidly secured a collar 67, Fig. 9, between which and the boss of the drum 56, is a friction washer 68, two other similar washers 68 being interposed one between the juxtaposed bosses of the drums 55, 56 and the other between the boss of the drum 55 and a thimble 69 fitted on the tubular shaft 66 with a capacity for moving thereon axially but not angularly. Between the thimble 69 and the bottom of the bracket boss 63 there is provided a helical spring 70 which constantly presses the bosses of the drums 55, 56, and washers 68 into close driving contact with each other, the highest and lowest of the said washers being constantly constrained to rotate by contacting respectively with the thimble 69 and the collar 67.

Within the tubular shaft 66 there is provided a bar 72 movable axially within it, for a purpose hereinafter fully explained.

The periphery of each of the matrix-selector drums 55, 56, is divided into, in the example represented, ninety equal divisions, each division represented by a stop, but as shown best in Figs. 10 and 10ª, the manner of such division differs in the two drums inasmuch as the upper drum 55 is divided into a series of nine groups or major divisions 55ª, each of ten stops 73, while the lower drum 56 is divided into a series of ten groups or major divisions 56ª each of nine stops 74; all of the stops of each group are arranged stepwise as shown best in Figs. 10 and 10ª, wherein the uppermost and lowermost stops of all the groups are illustrated, and the other stops of some of the groups are represented diagrammatically by inclined chain lines.

The upper matrix-selector drum 55 is provided with nine discriminating plungers 76, see particularly Fig. 8, situated at uniform angular distances apart, and all vertically slidable therein. These plungers are all rigidly secured to a vertically movable spider or frame 77 by which they can all simultaneously be depressed against the action of springs 78 one encircling each of said plungers, or raised by said springs which latter normally retain them in their uppermost position which is determined by the lower enlarged portions of the plungers abutting against the underside of the web of the drum 55 as shown in Fig. 9.

The depression of the frame 77 and plungers 76 is effected by a forked lever arm 79 which engages an annular groove 80 Figs. 9 and 11, in the boss of the said frame, this boss being axially movable on a sleeve 81 Fig. 9, fast to the bracket boss 63. The forked arm 79 is fast to a rocking shaft 82 on which also is fast a lever arm 83 on whose vibrating end is an anti-friction roller engaging with the groove (represented diagrammatically by a single chain line in Fig. 11) of a cam 84 Figs. 1ª and 11, fast on the before-mentioned horizontal shaft 61.

In the lower matrix-selector drum 56, there are pivoted ten radially disposed levers 85, each acted upon by a blade spring 86 and each, at its outer end, in permanent operative connection with a vertical discriminating or matrix-actuating pin 87, capable of sliding vertically in a guide projecting inwardly from the annular wall of the said drum. The levers 85 and pins 87 are respectively distributed at uniform angular distances apart, so that in each of the nine different stopping positions of the drum 56 corresponding with the nine stops 74 of each of the ten groups 56ª, Figs. 10, 10ª, one or other of the said levers will be directly beneath one of the ten plungers 76, the particular lever and plunger thus brought into coincidence depending upon which particular stop 73 of a group 55ª and stop 74 of a group 56ª, are, at that time, engaged by the respective stop levers 51. By these means there can be only one lever 85 and one plunger 76 in coöperative relationship at a time, and the full combination of ninety positions can be obtained from each group of stops on each drum so that no single setting of the drums can involve an angular movement of more than 36 degrees in the case of the drum 56 and 40 degrees in the case of the drum 55. For example let it be assumed that the drum 56 is arrested by a particular stop 74, then the drum 55 will be arrested by one of the ten stops 73 of the particular group 55ª which at that instant is most nearly approaching the respective projected stop lever 51, so that the particular lever 85 which will afterward be depressed, will depend upon the particular stop 73 which is arrested by the respective stop lever 51, these stops of the same group 55ª regarded successively, being causative of the operation of the ten levers 85 in regular sequence.

The five magazines of respectively different fonts of matrices, are, as a complete battery, capable of being turned around a hollow vertical pintle 88 fixed to the table 1 in such position that each of the magazines 89 can in succession be brought beneath, and into axial alinement with the two matrix-selector drums 55, 56, as shown in Figs. 4, 4ª, 9 and 12. Each of the magazines 89, see particularly Fig. 12, contains ninety different matrix levers 90 uniformly spaced around its interior, each connected to it by a pivot 91 on which it is capable of swinging from a normal erect position such as that represented at the right-hand side of Fig. 12 to a practically horizontal position such as that shown at the left-hand side of the said figure. For the sake of simplicity no matrix levers other than the two just previously referred to, are shown in Fig. 12. To each of the matrix levers 90 there is pivoted the lower end of a link or push rod 92 whose upper end is guided in a slot 93 Figs. 9 and 12, in the annular wall of the respective magazine 89, and is circumferentially alined with the upper ends of all the other push rods 92, so that all these ends are ranged in a circle. The diameter of the just-named circle corresponds with that of the circle in which are ranged the ten before-described pins 87, and as this is true of all the matrix magazines, it follows that when any of the latter is in operative position, beneath and axially alined with the matrix-selector drum 56, the said ten pins will be operatively alined with every ninth one of the push rods 92 each time that the rotation of this drum is arrested by one of the stop levers 51.

To each of the push rods 92 is attached a tension spring 94 which serves to return the said rod and the respective matrix lever 90 to normal position, when the pin 87 appertaining thereto is raised by its respective spring 86.

Matrices.

Each of the matrices 95, as shown best in Figs. 16 to 21, is in the form of a separate block having a stem 96 which, see particularly Fig. 16, fits loosely in the head of the respective matrix lever 90, and has secured thereon a collar 97 between which and an annular ledge 98 on the lever 90, a spring 99, encircling the stem 96, normally holds the matrix proper in close contact with the matrix lever 90 as shown in Fig. 16, while, at the same time, allowing the matrix, when lowered for presentation to the mold (as shown at the left-hand side of Fig. 12 to be depressed independently of the matrix lever, to bring it into metal-tight contact with said mold. The matrices 95, besides being loose in the matrix levers 90, in an axial sense, are loose therein in a lateral sense so that they can be pulled laterally to a given extent, by a squeeze-frame 100 for alinement purposes as hereinafter described, but they are prevented from turning to any appreciable extent about the axes of the stems 96, by these latter being of square section, as shown in Fig. 17, or of other non-circular section, and by forming the holes in the matrix levers through which those stems pass, of corresponding shape.

The formative cavity 101, of each matrix is indented in the casting face of the latter in such position as to provide on the left-hand side, as viewed in Figs. 16 to 21, that is to say, in such position as to provide on the advance or leading side thereof, a wall of say $\frac{2}{1000}$ inch thick, and on the following side thereof a wall which exceeds that thickness by an amount which is constant throughout all matrices of the same font, in other words all the matrices of a given font are provided with rear faces 102 which serve as abutments and, quite irrespective of the set-width of the formative cavities 101, are situated at the same distance from the nearest parts of said cavities.

The before-mentioned squeeze frame 100, see particularly Fig. 13, is pivoted on a stud 103 fast to a horizontal plate 104 which is rigidly secured to the top of the table 1, and this squeeze frame is formed with a rectangular hole 105 into which the matrices enter, as shown in Figs. 12, 13 and 14, when they are lowered as previously described. When a matrix is thus lowered it is still not in contact with the mold beneath it, and it is at this stage that the before-mentioned bar 72 is lowered to further depress the said matrix into metal-tight contact with the mold and retain it so, during the subsequent casting operation. The squeeze frame 100 is capable of turning upon the stud 103 to an extent determined by an adjustable stop 106 mounted on the plate 104, and angular motion is imparted to it, as hereinafter described, through a link 107 one end of which is pivoted thereto, and whose other end is pivoted to a rocking lever 108, Figs. 1ª and 13. The squeeze frame is further provided with an annular groove 109 see particularly Fig. 14, in which is vertically movable a spring-supported buffer ring 110 which receives the impact of the matrix levers 90 when they are depressed as aforesaid, each such lever, if desired, being provided with a projection 111 which, as shown in Fig. 12, will abut against the said buffer ring.

Each of the magazines 89 at its lower end, is provided with an outwardly projecting ring or flange 112 which, when the said magazine is co-axially beneath the matrix-selector drums, as shown in Fig. 9, engages between two fixed locating jaws 113 which serve to hold the magazine in proper operative position relatively to the mold in which the type are to be cast.

Casting mold.

The mold consists of four vertical walls 114, 115, 116 and 117, of which the front and rear walls 114, 115, having their faces extending in set-wise directions, for each given size or font of type, are practically immovable, although, as shown in Fig. 14, the front wall 114 is resiliently held in casting position by a helical spring 118, with force sufficient to resist the pressure exerted by the metal pump and insufficient to prevent the cast type from being moved laterally out of the mold.

The mold walls 114 and 115 are formed as hardened steel facings rigidly attached, the latter to the plate 104, and the former to a plate 119 slidable in guides 120 fast to the table 1. The spring 118 is contained in recesses in the outer end of the plate 119 and in a block 121 fast to the table 1, and this plate is provided with two set screws 122, Fig. 13, for limiting its movement under the action of the spring 118; by means of the set screws 122 the mold wall 114 can be adjusted to suit different sizes of type as may, for example, be necessary when changing one magazine 89 for another.

The mold walls or liners 116, 117 forming respectively the leading and following surfaces of the type body, are relatively and independently movable, and the wall 117 is moreover composed of two superimposed and relatively adjustable parts 117 and 117$^a$, hereinafter termed blades. The mold is completed at its lower end by the beforementioned tang severer and a pump nozzle 123, as shown in Fig. 14, which nozzle injects molten type metal through the said tang severer and into the mold which, at that time, is closed at its top by the particular matrix 95 then depressed on to it.

The casting of the first character or body of each line, see Fig. 22, takes place within the mold constituted by the four walls 114, 115, 116 and 117, 117$^a$, and the casting of each of the following characters or bodies of the line, see Figs. 23 to 27, takes place in a mold constituted by the three walls 114, 115 and 117, 117$^a$ and, on its leading side, the type or other body last previously cast.

The liner 116 has rigidly attached to it, a block 124 having a vertical stud 125 through which the said liner is moved rightward or anti-setwise by a lever 126 Figs. 1 and 12, and having also adjustable therein a set screw 127, which, by engaging with a rigid stop 128 fast to the table 1, limits the said rightward movement so that before the casting of each line is commenced, and during the casting of the first type of the said line as shown in Fig. 22, the casting face of the liner 116, that is to say, its extreme right-hand end will be at the first set-edge of type. Preparatory to the casting of the first type of the line, the casting face of the rear liner 117, 117$^a$, is also at the first set edge so that it abuts against the opposed face of the front liner 116.

The block 124, and therefore the front liner 116, is rigidly attached to two superposed horizontal bars 129 extending rightward, one over, and other under, the plate 104, as shown in Fig. 14, wherein it is seen that the upper of these bars passes between the plate 104 and the squeeze frame 100, and the lower of them is located in a recess in the underside of the plate 104. The rightmost ends of the bars 129 are united by a block in which is an adjustable set screw 130 adapted to coöperate with a stud 131 fast to a bar or blade holder 132 to which is detachably secured the blade 117. The two bars 129 and the blocks uniting their respectively opposite ends, form a frame which, for convenience, is hereinafter referred to as such and, when so mentioned, is identified by the reference numeral 129. This frame 129 is movable in longitudinal direction in suitable guides not shown in the drawings, its rightward movement being determined by the contacting of the set screw 127 with the stop 128, and its leftward movement being determined by the contacting of the set screw 130 with the stud 131. The distance between the set screw 130 and stud 131, when the casting faces of the liners 116 and 117 are in mutual contact, is the measure of the line of type to be cast, and that being so, the said measure can readily be varied by adjusting the set screw 130 relatively to the frame 129; there is no necessity for adjusting the set screw 127 during the normal working of the machine or at any time excepting during the initial "tuning up" of the machine in the factory.

The blade holder 132 is capable of moving only longitudinally on the table 1, being guided in suitable stationary guides not shown in the drawings, so that although the distance between the two blades 116, 117 varies from time to time, the said blades will always be accurately alined with each other.

The blade 117$^a$, is detachably secured to a holder 133 capable of sliding longitudinally on, and independently of, the blade holder 132, suitable guides, not shown in the drawings, being provided for allowing the said holder 133 to move longitudinally and in no other direction.

The movement of the lower blade holder 132 in anti-setwise direction, relatively to the upper blade holder 133, is permitted by a wedge 134 longitudinally movable between two opposing shoulders 135, 136, Figs. 22 to 25 formed respectively on the said holders. The wedge 134 is inclined on only the side which engages with the shoulder 135, the other side being parallel with the direction of longitudinal movement of the said wedge, and the latter is of such thickness at its thicker end that when it is projected to its maximum extent between the shoulders 135, 136, the casting faces of the two blades 117, 117$^a$ are exactly alined with each other, that is to say they are both in the same vertical plane, as shown for example, in Figs. 22 and 23.

The wedge 134 is provided with a transverse block or head 134$^a$ slidable in a guide 137 (see particularly Fig. 15) which admits of said wedge moving in setwise and anti-setwise direction when the blades 117 and 117$^a$ are correspondingly moved, and it is moved longitudinally by a bar 138 carrying the guide 137 at one end, and at the other end, see Fig. 1$^a$, being pivoted to a lever 139.

The two blade holders 132, 133 are connected together by a tension spring 140, Figs. 1$^a$, 2$^a$, and 22$^a$, which constantly tends to move them in anti-setwise and setwise direction respectively, that is to say, in such directions as would cause the shoulders 135, 136 to grip the wedge 134 between them. The casting face of the blade 117 is intermittently moved to the first set edge position by a lever 141, Fig. 1$^a$, which is rocked by a rotating edge cam 142, about a stationary vertical fulcrum 143, said lever engaging with a shoulder 144 on the blade holder 132. At the right-hand side of the shoulder 144 there is a gap 145, Figs. 22ª and 2ª which admits of the blade holder 132 being moved leftward independently of the lever 141 to enable the completed lines of type to be pushed into the galley. The blade 117ª and its holder 133, are longitudinally reciprocated by a lever 146 rocked about a stationary vertical pivot 147 by a rotating grooved cam 148, with the groove of which a roller on said lever engages, so that, unlike the lever 141, this lever 146 is positively rocked in both directions; for the sake of clearness, the groove of the cam 148 is indicated by a single chain line in Fig. 1ª, said line being located at what would be the middle of the cam groove, if the latter were shown. The two cams 142 and 148 are rigidly secured to the same vertical shaft 149, on which is also secured an edge cam 150 which, conjointly with a tension spring 151, Fig. 1ª, rocks the before-mentioned squeeze frame lever 108. The lever 146, when moving on its pivot 147 in clockwise direction, actuates the blade holder 133, through a spring-pressed buffer block 152 slidable on the said holder, the spring of this block yielding to allow the said lever to complete its clockwise motion when the setwise path of the blade 117ª is arrested, as it is when the end of the latter abuts against the before-described abutment face 102 of a matrix 95.

Figure 26:
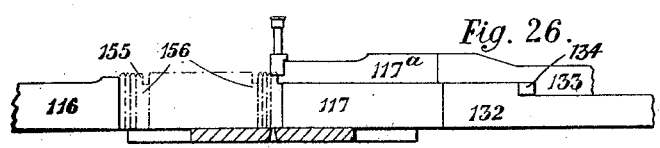

The withdrawing movement of the wedge 134 is limited according to the position of the horizontal justification rod 153, which, like the before described bar 138, adjacent thereto, see Figs. 1ª and 13, is longitudinally movable in a guide forming part of the plate 104, so that the casting faces of the two blades 117, 117ª are correspondingly brought more or less out of coincidence, as shown for example in Fig. 26, to allow for the casting of a wider or narrower space on the type body next to be produced; in the just-named figure, the particular type body is represented in chain lines, and is an intermediate body and space in advance of a type body still to be cast and added to the line; that shown as an example in Fig. 25 is the last type body and space of the line.

Figure 23:
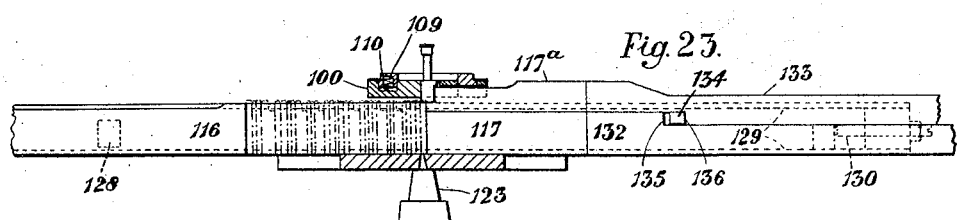
Figure 24:
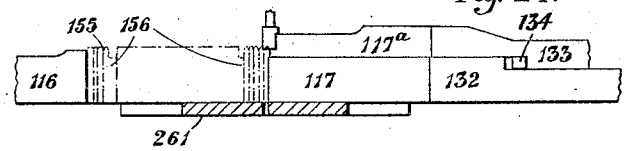

Before the last type of the line is cast, the wedge 134 is withdrawn, and the blade holder 132 and blade 117 are moved anti-setwise until stopped by the set-screw 130, as shown in Fig. 23, so that when that type is cast it will exactly fill out the line to the absolute lock-up length quite irrespective of space or set-errors, and the upper part of this type, which would be above chase height and would correspond with the blade 117ª, may be of that exact lock-up length as shown in Fig. 23, or slightly exceed that length as shown in Fig. 24, or be slightly less than that length as shown in Fig. 25, according to the then relative positions of the mold blades 117, 117ª.

Figure 27:
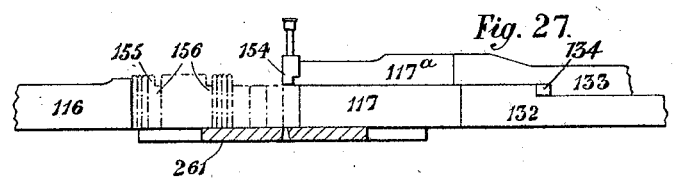

The before-described Figs. 22 to 26 show the devices suitable for casting type with low spaces such as is desirable in type for printing direct on to paper, and, for casting low quads, the machine is equipped with a specially deep un-recessed matrix body 154 Fig. 27 so that when the wedge 134 is withdrawn to its maximum extent, the top of the quad will be formed by the coplanar under surfaces of the body 154 and blade 117a.

The machine readily lends itself to adaptation for casting type with high spaces such as is desirable in type from which electrotypes or stereotypes have to be taken, for which purpose the blades 117, 117ª shown in Figs. 22 to 27 would be substituted by others of respectively greater and less depth as shown in Figs. 28 and 29 in which latter figure the said blades are shown coöperating with an un-recessed matrix body to produce high quads.

Spacing mechanism.

As the machine is designed for casting the type separately and individually, it is necessary to form the spaces in succession as and where required in the line, and that being the case it becomes necessary, before such spaces are cast, to determine what their set-widths will have to be in order that the spaces conjointly with the type-bodies themselves, will properly fill out the line to the desired measure. It is impossible to so determine these set-widths until after a complete line has been keyed out and the shortage from the full measure recorded, and it is by the mechanism next described, that the machine, before casting the type, automatically adds together the set-widths which the bodies of these type, independently of the spaces, will have in the finished line, subtracts the sum from the lock-up length of the line, divides the remainder by the number of spaces in the line and sets and locks the justification rod 153. This justification rod thus becomes a rigid stop for determining the extent of withdrawal of the wedge 134 and consequently the position of the mold blade 117, so that each of the respective type bodies 155 will be cast with a space 156 which, together with all the other spaces and type bodies, will fill out that line to lock-up length to practically mathematical precision. For this purpose, each of the character keys 2, as distinguished from the space key 4, is so arranged that, when depressed, it moves, or causes to be moved step by step, a summation slide 157, Figs. 1ª, 4ª, 31 and 40, to an extent equal or proportional to the set-width appropriate to the type character appertaining to that key.

For each font dealt with by the machine, there is provided a horizontal set-width cylinder 158 (there are five in the example illustrated, see particularly Fig. 32) for controlling the intermittent angular flights or positions of a helical cam 159, all these cylinders being rigidly connected together and revoluble as a whole about a horizontal axis so that any one of them can be brought into operative position and fixed there, preferably synchronously, as hereinafter described, with the bringing into operation of a given one of the magazines 89.

Many of the characters of a font of type, for example b, d, g, h, k, n, p, q, u and x, are usually allowed the same set-width, and it is found that a full font need call for no more than twenty different set-widths, and consequently in the example given, the machine is designed to arrest the helical cam 159 in twenty different angular positions. For this purpose, each set-width cylinder 158 is provided with a series of thrust rods or bent arms 160 corresponding in number with that of the character keys 2. The ends of the arms 160 which are parallel with the axis of the respective cylinder 158 are arranged in a circle concentric with the said axis as shown best in Fig. 36, and when that cylinder is in operative position, those ends are each in axial alinement with a push rod 161 operatively connected with the respective character key 2, as hereinafter more particularly explained.

All the arms 160 appertaining to type characters of the same set-width are rigidly secured to one and the same disk 162, as shown for example in Fig. 36 wherein the arms appertaining to six such type characters are shown to be thus mutually connected. All of the disks 162 each appertaining to one of the twenty set-widths for which the machine provides, are axially slidable along a relatively fixed guide rod 163 fast in the two ends of the respective set-width cylinder 158 and each such disk has rigidly secured to it a rod 162$^a$ parallel with the axis of the cylinder and longitudinally movable therein against and under the action of a helical spring 164 which normally retains said rod in its foremost position, that is, the rightmost position in Fig. 31. On each of the rods 162$^a$ there is rigidly secured a so-called set-width pin 165, the outer portion of which is parallel with the said rod and, as shown in Figs. 31 and 33, projects through, and is slidable in, the rear wall of the respective set-width cylinder 158. The several ends of the pins 165, as shown in Fig. 33, are arranged in two concentric arcs of somewhat less than ninety degrees, each such pin occupying an angular position different from that occupied by all the others.

Rearward longitudinal displacement of a rod 162$^a$ (effected as hereinafter described) moves the rear end of the corresponding set-width pin 165 into the angular path of an arm 166 fast on the front end of a horizontal rocking shaft 167 mounted in ball or equivalent bearings in a bracket 168 extending downward from a bracket 173. On the rear end of the shaft 167, the before-mentioned helical cam 159 is rigidly secured so that it will be seen that, according to the particular set-width of each matrix actuated and consequently according to the particular set-width pin 165 projected, so will the angular flight of the cam 159 be shorter or longer.

The angular movement of the arm 166 and cam 159 is imparted to them by or through the depression of each character key 2, which latter also serves for oscillating a lever 169, Figs. 31 and 32, of which one end, normally bearing against a stop 170, is caused to move an electro-magnetic gripper 171, and the other end, when the gripper is so moved, has its path arrested in different angular positions by the helical face of the cam 159, according to the particular angular position then occupied by the latter.

The lever 169 is pivotally connected to the table 1 and the just-mentioned gripper which, when referred to as a whole is identified by the reference numeral 171, comprises the following parts: A laminated magnet 171 having three vertical prongs, vertically and longitudinally alined with the before-mentioned summation slide 157, which is capable of sliding longitudinally within a stationary guide or saddle 172 secured to a block 173 fast to the table 1, to which block the above-named lever 169 is directly pivoted. At each end of the magnet 171 is provided a vertical plate 174 of insulating material, against the front one of which the upper end of the lever 169 is adapted to bear. Within the saddle 172 there is secured a stationary hollow coil 175 within the hollow of which the central prong of the magnet 171 is movable in a direction fore and aft of the machine. The upper end of the lever 169 is pressed against the gripper 171 by the act of depressing a character key 2, and when so pressed, it moves the said gripper rearward against the action of a spring 176 until the lower end of said lever abuts against the helical cam 159 which, as previously described, has by the same depression of the character key, been turned to a position proper to the set-width of the character appropriate to that key.

The depression of a character key through contacts and conductors not represented in the drawings, completes an electric circuit through the coil 175, so that when the gripper 171 is moved as just described, it carries along with it, the before-mentioned summation slide 157 to which it is then magnetically attached through the excitation of the coil 175. When the character key 2 last previously actuated is released, the upper end of the lever 169 is returned to normal position in contact with the stop 170 through the gripper 171 being moved toward the front of the machine by the spring 176.

The summation slide 157 is guided preferably by ball bearings in the block 173, and its upper surface is smooth, and after it has been moved by the gripper, as just mentioned, it is held by an electro-magnetic detent 177 the magnet of which is energized in alternation with the magnet of the gripper 171. When the machine is ready for operation and before the actuation of any of the character keys 2, the magnetic detent 177 is energized and the magnetic gripper is deënergized and when any of the character keys are depressed, the magnetic gripper 171 is energized and the magnetic detent 177 is deënergized, these electrical functions being reversed when the then-depressed key is next released. By the means just described the summation slide 157 is caused to act as a rack with an infinite number of infinitesimal teeth and is subjected to no wear which could prejudice its effectiveness; in addition, the slide may be advanced in strict proportion to the set widths of the matrices irrespective of the commensurability of such set widths.

The just-described magnetic devices are preferably of thick wire design and low voltage, and are energized by a small heavy bar and slow speed generator not represented on the drawings and not necessarily constituting part of the general mechanism.

It will be seen that by the just-described mechanism a true record of the set-width of character matter in a line, is obtained in the aggregate movement imparted to the summation slide 157 by the electro-magnetic gripper 171, and that being the case, and the total lock-up or justified length of said line being already known, a subtraction of the former from the latter will give the aggregate set-width of the spaces in the line, and a division of this aggregate set-width into the number of spaces in the line, then also already known, will give the set-width size of each of those spaces. For obtaining these results automatically, the particular position of the summation slide 157 is utilized for determining the movement, in relatively opposite directions, of two bars, one, termed a setting V bar, to the extent of movement from its zero position of the summation slide 157, and the other, termed a locking yoke bar, to the extent of the set-width of the spaces required to fill out the line. These bars and the means for directly operating them are shown in detail in Figs. 38 to 43, wherein the setting V bar and the locking yoke bar are respectively identified by the reference numerals 178 and 179. These two bars are guided so that they can move longitudinally forward and rearward of the machine and in no other direction in a casing 180 rigidly secured on the table 1. The setting V bar 178 has fast to it a block to which is attached a setting V 181, and to which is pivoted a pulley 182. Around this pulley 182 extends a cable or chain 183, one end of which is rigidly secured to a block 184ª fast on the locking yoke bar 179 and on which block is rigidly secured the locking yoke 184 which is substantially alined with the before-described locking V 181.

The locking yoke 184 has rigidly attached to it a bent or offset bar or hook 185 passing between the rack bar 190 and the ladder 189 and having its nose portion extending up in position to engage the forward edge of the ladder (see dotted line showing particularly in Fig. 40) for a purpose hereinafter described. The locking yoke bar 179 is encircled by a helical spring 186 which, by acting on a collar 187 fast on said bar, serves to return the latter to normal position when the cable 183 is released as hereinafter described.

The setting V 181 and locking yoke 184, when moved towards each other, are caused to embrace between them a pin 188 constituting one of a number of similar pins or rungs of what is hereinafter termed a "ladder". This ladder 189, is, at one end, in pivotal connection with a horizontal bar 190 herein termed a rack bar, which, for each space to appear in the finished line, is moved longitudinally by a pawl 191, a distance equal to that between any two adjacent rungs 188 of the ladder 189, so as to bring the said rungs 188 successively into the path which will be followed by the setting V 181 and the locking yoke 184, a spring-pressed detent 371, Fig. 1ª, being provided for temporarily maintaining the rack bar 190 and ladder 189 in each position so attained. The pivoted connection between the ladder 189 and the rack bar 190 is such that when, during the forward movement of the bar 179 the locking yoke 184 engages with the rung 188 then in its path, that rung will be free to travel as if in one piece with the yoke 184 or in a straight path during the further forward movement of the latter. For that purpose the pivot 192 which is fast to the ladder 189 is pivoted in the two parallel members of a yoke 193 (see particularly Fig. 42) which is capable of sliding parallel with, but independently of, the rack bar 190 against the action of a compression spring 194, which tends always to press the yoke 193 to its left-most position relatively to the rack bar 190, which position is determined by the ends of slots 195 formed in the above named yoke members, abutting against the two ends of a stud 196 fast in the rack bar 190. The spring 194 is seated at its left-hand end in a pocket 197 formed in the closed end of the yoke 193 and at its right-hand end against the stud 196. The rack bar 190 and the yoke 193 are constrained to move only in longitudinal direction by grooves formed in the casing 180. The casing 180 is closed by a cover 198 which can be removed as in Fig. 39, when access is to be had to the interior of said casing.

When the operator has keyed out a line and the rack bar 190 has consequently moved the ladder in set-wise direction to correspond with the number of spaces in that line, the setting and locking bars 178 and 179 are successively moved toward the particular rung 188 then in their path, the setting V bar 178 traveling rearward as far as is allowed by the previously set summation slide 157, and the locking yoke bar 179 afterward traveling forward first to bring its yoke 184 into engagement with the said rung, and then, by that yoke, to carry that rung into engagement with the setting V 181 as shown for example in Fig. 39.

The last-named figure shows the ladder in an inclined position such as it assumes when a maximum number of spaces are used, each space being for example, a tenth of an inch, and Fig. 38 shows the ladder in its normal position, in dotted lines.

The ladder 189 is provided with a stud or projection 199 adapted to be engaged by a T head 200 fast to the before-mentioned justification rod 153 which controls and limits the extent of withdrawal of the space wedge 134 from between the two mold blades 117, 117ª, so that each space cast on a type body will be of such set width as will enable it, together with all the other spaces and type bodies of the line, to completely fill out the latter to the lock-up measure.

In the example illustrated in the drawings, it is assumed that the maximum number of spaces in a line is twenty and that the space wedge 134 has an inclination of one in ten; for that reason the ladder 189 is represented as provided with twenty rungs 188, and with the stud 199 coinciding with the tenth rung.

By reference to Figs. 5, 31, 38 and 40, it will be seen that the summation slide 157 is provided with a downturned projection or hook 201 and that the setting V bar 178 has an upturned projection or hook 202 which is adapted to engage the hook 201, for limiting, as before described, the rearward movement of the said V bar.

In Fig. 40 the setting V bar 178 is shown in its foremost or starting position, and before commencing to key out a line, the summation slide 157 would similarly be in its foremost position with its hook 201 contacting with the hook 202 of the setting V bar 178 as shown in Fig. 31. After a line has been keyed out, the summation slide 157 will have been moved a distance, $s$ Fig. 40, corresponding to the total set-width of the character matter in the line, and consequently the distance which the setting V-bar 178 will be able to move before being stopped by its hook 202 contacting with the hook 201, subtracted from the total lock-up length of line, will give, as a remainder, the total set-width of the spaces required to fill out that lock-up length. With that ascertained, and the total number of spaces having been recorded through the actuations of the space key 4 (each such space corresponding with one of the ladder rungs 188) the last described space-dividing mechanism automatically determines the set-width of each such space with mathematical exactitude.

To facilitate an understanding of the working of the space-dividing mechanism, attention is now directed to the diagram appearing in Fig. 43. In this diagram $r$ represents the total set-width of the spaces required to fill out a line, that is to say the above-named remainder obtained by subtracting the length $s$ Fig. 40, from the lock-up length of line, and $t$ is a length equal to five convenient units $u$ which merely represent the number but not the set-width of the spaces required. Then in the triangle formed by the sides $r$, $t$, and $v$, the horizontal projection $w$ of a unit $u$ on to the base line, will give $\frac{1}{5}$ of the length $r$ and this is the set-width of each of the required spaces.

The line $t$ with its extension is representative of the ladder 189 and the above-named units $u$ are each representative of the distance between the centers of any two adjacent rungs 188. When the triangle $r$, $t$, $v$ is constructed as shown, and $w$, as above stated, gives the set width of each space, then the tenth unit or rung stands at a distance $10\ w$ from normal, which distance equals the length of movement required to be given to a 1-in-10 wedge such as 134 for providing for the casting of a space of the set-width $w$.

The horizontal line drawn through the topmost rung 188 represents the axis of the ladder 189 when the latter is in its initial position as it is shown to be in Fig. 38, and the line $x$—$y$ is representative of a corresponding vertical line $x$—$y$ Fig. 38 passing through the center of the setting V 181 and locking yoke 184. By the operation of the character keys 2, which, cause step-by-step movement of the summation slide 157, and of the space key 4, which causes step-by-step movement of the rack bar 190 the length $10\ w$ is determined.

The before-mentioned cable 183 passes out through the rear end of the casing 180 and around a guide pulley 203 and thence rightward to a tension spring 204 which, as shown in Fig. 1ª connects it to the rear end of a lever 205 pivoted at 206 to the table 1 and to whose forward end is attached a tension spring 207. When the lever 205 is rocked clockwise and antagonistically to the spring 207, by the means hereinafter described, the setting-V bar 178 is moved rearward until its hook 202 is arrested by the hook 201 of the summation slide 157, and at this juncture the cable 183 draws forward the locking yoke bar 179 against the action of the spring 186, so as to first bring the yoke 184 into engagement with the particular rung 188 then in its path, and then carry that rung into the setting V 181 which arrests its further forward movement; if, at this stage, the lever 205 had not reached the end of its clockwise movement, the remainder of such movement will serve merely to extend the spring 204. When the lever 205 is allowed to swing anti-clockwise under the action of the spring 207, the spring 186 will effect the return of the locking yoke bar 179 to its normal position, and, through the hook 185 which engages the forward edge of the ladder 189 carry the latter along with it, also to normal position, and a light spring 157ª, Fig. 31, will return the summation slide 157 also to normal position, the hook 201 of this slide by engaging with the hook 202 serving to carry the setting V bar 178 along with it.

*Mechanism for adjusting set-width cam 159.*

The before-mentioned push rods 161 are actuated from the key levers 2 by the following mechanism. To the rear end of each such lever there is pivoted the upper end of a rod 208, Figs. 3 and 5, which, at its lower end, is pivoted to a lever 209 and just above that pivotal point is guided in a fixed bracket 210. The levers 209 are ranged in two parallel horizontal banks as shown in Figs. 2, 2ª and 3, and, as shown in chain lines in Fig. 1ª, they incline leftward from the rods 208 toward the front of the machine, where they are pivoted each to the lower end of a link 211 whose upper end is pivoted to the horizontal arm of a bell-crank lever 212. The levers 209 are pivoted, each in an inclined slot in a stationary bracket 213 wherein they are retained by a cover plate secured to the respective bracket and extending over all the levers of the same horizontal bank, these levers rocking in contact with said cover plates which thus serve as their fulcra.

The bell-crank levers 212 are pivoted to a downwardly extending bracket 214 in which also are pivoted vertical levers 215 with whose lower ends the vertical arms of the bell-crank lever 212 are in constant operative contact in such wise that when a key lever 2 is depressed, the upper end of the lever 215 corresponding therewith is rocked rearward, and as this said lever end is in permanent contact with the respective push rod 161, this rod is correspondingly moved rearward into engagement with its respective thrust rod 160.

The several push rods 161 and levers 215 are divided into two groups as shown in Figs. 31 and 32, said groups being operatively connected each with the levers 209 of one of the above-named banks, and they are guided in stationary frames or rings 216 wherein they are constrained to move only rectilinearly in fore and aft direction. Each push rod 161 is encircled by a compression spring 217 which bears on a collar fast on said rod so as to return the latter to normal position when the respective key lever 2, after depression, is released by the operator.

The before described gripper lever 169 is actuated by each of the levers 215 and therefore correspondingly by each of the key levers 2, through a link 218 which is pivoted at one end to said gripper lever and, at its other end to the upper end of a lever arm 219. This lever arm 219 is fast to a shaft 220 rocking in bearings in a fixed bracket 221, and on which shaft is rigidly secured a bail 222 the horizontal member of which extends immediately behind the upper ends of all of the levers 215 of one of the above-named groups. The levers 215 of the other of the just-named groups, engages the horizontal member of a bail 223, this member extending immediately behind the upper ends of all of those levers. The bail 223 is free to rock about a stationary pivot rod 224 and is provided with rearward projections 225 in constant engagement with the front of the bail 222, so that when the bail 223 is directly operated by its lever 215, that bail will, in turn, simultaneously operate the lever arm 219.

The pivot 226 which connects the link 218 with the lever arm 219 is fast in the latter and is capable of sliding in a slot 227 in the former, a tension spring 228 connected to the link and pivot, serving normally to hold the pivot in contact with the rear end of the slot 227 while yet allowing said pivot to travel along the slot if and when the swing of the lever 169 is arrested by the helical cam 159 before the arm 219 has completed its movement.

The helical cam 159 and arm 166 receive their angular motion through a two-armed lever 229 Figs. 31 and 33, pivoted to the bracket 168 and of which one arm is provided with a pin 230 which normally stands against a locking abutment 231 on the arm 166 as shown in dotted lines in Fig. 33, and which, when swung clockwise, as viewed in Fig. 31, engages a cam surface 232 and through that surface carries with it the arm 166 to the angular position previously determined by the particular set-width pin 165 which, at that time, is projected into its path; this movement is in opposition to a tension spring 233 which returns the arm 166 and cam 159 to normal position when a depressed key lever 2 is released. The second or downwardly extending arm of the lever 229, through a pin 234 and slot 235, is connected to a horizontal rod 236, the pin 234 being normally held in contact with the rear end of the slot 235 by a tension spring 237 attached at respectively opposite ends to the said pin and to the rod 236.

The forward end of the rod 236 is in constant engagement with a swinging frame 238 fast to a shaft 239 journaled in the before-mentioned bracket 221 said frame being provided with two horizontal bars 238$^a$ each of which extends along the back of one of the two groups of levers 215 so that whenever any one of such levers is operated through the actuation of the corresponding key lever 2, the frame 238 will be swung about the axis of the shaft 239 and through the rod 236, spring 237 and lever 229, the cam 159 and arm 166 will be swung about the axis of the shaft 167.

In Figs. 31 and 32 the rod 236, for the sake of simplicity is shown straight, but in this form it would interfere with the adjustment of the set-width cylinders 158, and for that reason, in actual practice, it would be bent or otherwise constructed or connected so as to be clear of the path of the said cylinders 158 when these latter are revolved around their common axis.

The projection of the push rods 161, may be utilized for controlling the angular movements of a series of type-carrying segments or drums 240 Figs. 31 and 37, so that said segments conjointly with other well-known type-writer organs will serve for automatically typing a record of all the operator sets up and incidentally provide means for detecting errors of setting. When such an error is detected, the operator returns the respective pair of calipers 36 to the correcting position as previously described and, after making the necessary correction, restores the respective sector 20 or 20$^a$ to the pre-correctional position and resumes the normal setting operation.

In an already known construction of typewriter, means have been employed for angularly moving segments or drums such as 240 to varying pre-determined extents, and, as a convenient example, Figs. 31, 34 and 35, show these means applied to a like purpose in connection with the present invention; it is, however, to be understood that no claim is made to said means apart from their combination with features which actually do constitute part of this invention. In the arrangement illustrated in the last-named figures, there is provided a four-armed flier 241 of known construction see particularly Figs. 34 and 35 which is fast to a short horizontal shaft 242 and is free to move angularly in the space normally existing between the opposed ends of the arms 160 and push rods 161. The flier 241 is moved angularly by a pin 230$^a$ which, like the pin 230 appertaining to the arm 166, normally stands in front of a locking abutment 231$^a$, see particularly Figs. 34 and 35, and, by its angular movement is caused to impinge against a cam surface 232$^a$ and turn the flier in the direction indicated by the arrow in Fig. 34, into a position such as that in which it is shown in Fig. 35. The angular movement of the flier 241, will be arrested by the particular push rod 161 last projected across the above-named space, and the amplitude of such movement will depend upon the angular position of that rod.

The pin 230$^a$ is fast to an arm 229$^a$ which, at its forward end, is penetrated by the shaft 239, and is connected to that shaft by a spiral or other spring, not shown in the drawing, which admits of the shaft completing its angular motion if and when the flight of the flier 241 is arrested before such completion is attained.

*Mechanism for operating recorder.*

The flier 241 or the shaft 242 thereof has fast to it a toothed pinion 243 meshing with a rack on the lower end of a rack rod 244 on whose upper end is provided a toothed rack 245, see particularly Fig. 37, meshing with a pinion 246 capable of rotating upon a non-rotating shaft 247 which also is capable of sliding axially through the said pinion 246. The shaft 247 is supported in two bearings 248 which guide it in its axial motion and to one of which the pinion is in swiveled connection so that it (the said pinion) can move only angularly. The pinion 246 has rigidly attached thereto a crank arm 249 which engages the type segments 240 so that these latter, while always constrained to move angularly with that pinion, are capable of moving axially in company with the shaft 247 on which the type segments are movable in only angular direction. By this arrangement any of the type segments 240 can be brought under an impression hammer 250 according to the segment which bears the character appropriate to the particular key lever 2 actuaed.

The shaft 247, at its front end, is in operative contact with the vertical arm of a bell-crank lever 251 rocking about a fixed pivot 252 and whose other arm is pivoted to the upper end of a vertical link 253 whose lower end is pivoted to a three-armed lever 254 fast to a rocking shaft 255 on which there is also rigidly secured a lever arm 256. The lever 254 is provided with two horizontal rods 257, 258 rigid therewith, and the lever arm 256 is provided with a similar rod 259, each of these three rods extending along the front of, and in operative contact with, those of the levers 215 which involve an axial shift of the type segments 240, the said rods being situated at respectively different radial distances from the axis of the shaft 255 so that they will cause the type segments 240 to move rearwardly as a whole, to varying extents to bring them into their proper relative typing positions. The just-described devices move the shaft 247 antagonistically to a spring 260 which moves the type segments 240 forwardly into normal position when the respective key levers 2 are released.

*Tang severing and ejecting mechanism.*

The before-mentioned jet plate, in the form of a circular disk 261, Figs. 13 and 14 is fast to a vertical flanged stud 262 capable of rotating in a bearing formed in the plate 104, a compression spring 263 bearing upward against the flange serving to hold the disk in metal-tight contact with the underside of the casting mold. The disk 261 is integral with, or rigidly attached to a ratchet wheel 264, with which engages a spring-pressed pawl 265 pivoted to a longitudinally reciprocating bar 266. This bar is moved in relatively opposite directions by a rotating face cam 267, shown in dotted lines in Figs. 1ª and 2ª, and a compression spring 268 Figs. 12 and 13, which serves to maintain the said bar in constant operative connection with the cam. The cam 267 is fast on a horizontal shaft 269 which is operated by means hereinafter described. The disk 261 is provided with an annular series of jet holes 270 which are adapted to successively register with the casting mold, as shown with regard to one of them in Figs. 12 and 14 and the length of stroke of the bar 266 and diameter of the ratchet wheel 264 are such that successive reciprocations of the said bar, bring successive jet holes 270 into register with the casting mold.

The bar 266 has pivoted to it a second pawl 271 which is adapted to engage with the teeth of a ratchet wheel 272 fast to the lower end of a short hollow shaft 273, see particularly Fig. 14 journaled in the table 1, and plate 104 and having fast to its upper end a cam disk 274 which, when rotated intermittently, raises a disk 275 rigidly attached to a spindle 276 extending down through the just-mentioned hollow shaft 273. On the lower end of the spindle 276 there is provided a compression spring 277 which exerts its pressure between the ratchet wheel 272 and a nut 278 threaded on the lower end of the spindle 276. The disk 275 has fast to it a downwardly extending pin 279 which is free to move axially in a hole formed in the plate 104, and the lower reduced end of which, as shown in Fig. 14, is adapted to enter the jet holes 270 as they are successively presented beneath it, this operation serving to both eject any jets which may still remain in the jet holes when they coincide with the pin 279 and incidentally to lock the jet disk 261 in its several casting positions.

When, as aforesaid, the jet disk 261 is moved angularly the jet which, before said movement connects the last previously cast type body with the molten metal in the nozzle 123, this disk severs that jet from the said body and metal, the intervening portions of the jet disk 261 serving to close the aperture of the nozzle 123 during the periods between registration with the latter and the successive jet holes 270.

*Metal pump.*

Figure 3:
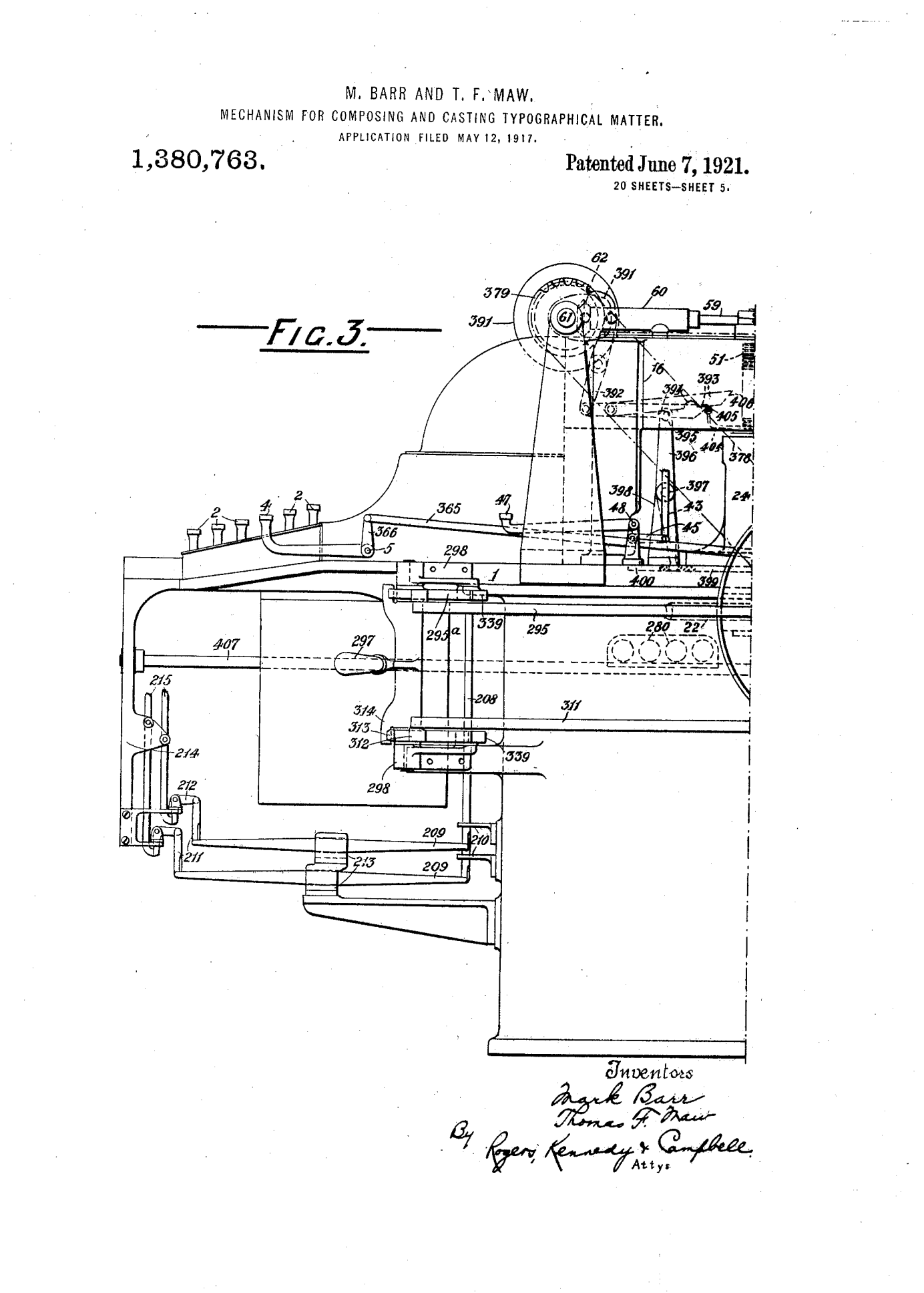

As shown best in Figs. 1, 3 and 5, the metal pump 280 is preferably provided with a plurality of cylinders, in the example illustrated there are four. The plungers 281 within these cylinders, are operated in rotation so as to deliver jets of molten metal at the same rate as that at which the matrices 95 are presented in casting position. This result may be attained by any suitable construction of cam mechanism operated from the before-mentioned shaft 61. In the example illustrated the shaft 61 secures the just-named result through spiral gearing 282 through which the pump cam shaft 283 is rotated. As no claim is made specifically to this pumping mechanism further description thereof is not herein deemed to be necessary.

*Prevention of splashing of metal.*

To avoid any possibility of the splashing of molten metal at the thin or leading edge of the matrix, it is preferable, as shown in Fig. 30 to form the casting face of the mold blade 117ª with a slight bevel 284 which, as shown in chain lines in the said figure, will serve for casting on each preceding type body a slight overhand 285, which, when that type body is positioned to the first set edge, will extend anti-setwise under the thin edge of the matrix above referred to, and consequently form an efficient seal at that part to prevent the molten metal escaping. Although the overhang may extend even beyond the above-named thin edge of the matrix, it will in no way prejudicially affect the casting of a succeeding type which under those circumstances, would be cast with a slight recess around the said overhang.

The last-described casting of a recess in one type body around a projection cast on the last preceding body, will serve to lock those two bodies together, and this result may, if desired, be augmented by casting other interlocking surfaces on the type bodies or in any other convenient manner.

Operating and driving mechanism.

The several essential organs of the machine have hereinbefore been described in their respective individual capacities, and it remains now to explain how all these organs are coördinated so that each shall fulfil its function in proper order. As a convenient point from which to describe this coördination, it is assumed that the first operated member of the machine is the pulley 286 which is constantly rotated from any convenient motor.

This pulley 286 is keyed to a tubular shaft 287 within which the before-mentioned shaft 269 is capable of being independently rotated. On the tubular shaft 287 is keyed the worm 21 which, as before described, engages with the worm-wheel 22 which serves to rotate the two caliper sectors 20 and 20ª. The hollow shaft 287 has also rigidly secured to it a clutch member 288 with which a slidable clutch member 289 is capable of being periodically engaged, the said sliding clutch member being splined to the right-hand end of the shaft 269 so that when it, (the said member) is engaged with the member 288, the shaft 269 will rotate as if in one piece with the pulley 286. Axial movement of the clutch member 289 is imparted to it by means of a bell-crank lever 290 turning about a fixed pivot 291 and engaging the said clutch member by studs coöperating with an annular groove in that member in the ordinary well-known manner.

The extreme right-hand end of the shaft 269 is rotatable in a fixed bearing 292 and close against the inner side of this bearing the said shaft has rigidly secured thereon a bevel wheel 293 integral with a sprocket wheel 294. The bell-crank lever 290 is actuated through a link 295 pivoted to it, and which, at its forward end, is pivoted to a lever 295ª loose on a vertical shaft 296 on which also is loosely mounted a starting lever or handle 297 by which the machine is thrown into operation. The vertical shaft 296 is journaled in rigid bracket arms 298, and the upper end of the vertical boss of the starting handle 297 is formed with a lug 299 which is adapted to engage with a lug 300 on the lever 295ª and through that lug move the link 295 rearward, so as to effect the closure of the clutch 288, 289.

On the tubular shaft 287 there is secured a sprocket wheel 301 Figs. 1ª and 2ª, this sprocket wheel engaging with a chain 302 which, in its lower bight, engages with a sprocket wheel 303 fast to a clutch member 304 which is capable of rotating about a short horizontal shaft 305 on which is splined a movable clutch member 306. This movable clutch member, through an annular groove therein is engaged by a clutch fork 307 fast to the lower end of a vertical shaft 308 journaled in a fixed bracket 309 and on whose upper end is rigidly secured a crank arm 310 pivotally connected to a link 311 located beneath the before-described link 295. The link 311 extends forward and rearward of the point at which it is connected to the lower arm 310 and at its forward end it is pivotally connected to an arm 312 which is pivoted concentrically with the boss of the starting handle 297 and is provided with a projection or abutment 313 adapted to be engaged by a lug 314 integral with the above-named boss of the hand lever 297. Near the rear end of the link 311 the latter is supported on a radius arm 315 pivoted in a bracket 316 and fulfilling no practical function beyond merely supporting the link 311 at that end. The right-hand end of the shaft 305 is rotatable within a stationary bearing 317 and just at the inside of that bearing there is secured on the said shaft a miter gear wheel 318 meshing with a wheel 319 fast on the front end of a horizontal shaft 320 on whose rearward end is rigidly secured a worm 321 meshing with a worm wheel 322.

The just-mentioned worm wheel 322 is keyed on a horizontal shaft 323 free to rotate in stationary bearings at the back of the machine and on the leftward end of this shaft there is secured a cam 324 engaging the rear end of the lever arm 325 fast to a vertical shaft 326 on whose upper end is secured a lever arm 327 which is operatively connected through a link 328 with the before-described lever 126 by which the blade holder 132 is moved anti-setwise as previously explained and afterward setwise for bringing the completed cast line in front of a pusher 329 which thereafter pushes the line forward in a galley 330.

The before-described miter wheel 293 meshes with a corresponding miter wheel 331 fast on an inclined shaft 332 on whose rear end is secured a worm 333 meshing with a worm wheel 334 fast on a horizontal shaft 335, which latter is rotatable in bearings at the back of the machine above the before-mentioned shaft 323. At the right-hand side of the worm wheel 334 there is provided a trip arm 336 journaled on the boss of the said worm wheel and connected to the latter through a tension spring 337 which tends always to hold the trip arm 336 in contact with a stud 338 projecting sidewise from the said worm whel. The worm wheel 334 is provided with a second stud 338ª which, conjointly with the stud 338, serves to limit the angular motion of the trip arm 336 relatively to the said worm wheel. The rear end of the link 295 extends into the path followed by the outer end of the trip arm 336, so that, as this trip arm rotates along with the worm wheel 334 in the direction indicated by the respective arrow in Fig. 3ª, this trip arm will abut against the extreme rear end of the link 295 and will remain stationary for the brief period occupied by the stud 338ª moving forward and coming into contact with the rear edge of the said trip arm, at which juncture the trip arm will rotate as if in one piece with the worm wheel 334 and move the link 295 forward to open the clutch 288, 289 through the action of the bell-crank clutch lever 290. Before this opening of the clutch 288, 289 was effected, the said clutch was retained closed by means of a spring catch 339 which engaged with a notch 340 in a rearwardly extending arm integral with the before-described lever arm 295ª, this said arm being further provided with an inclined surface 341 which serves for supporting the spring catch 339 when it it is desengaged from the notch 340, this disengagement being effected by the previously described forward movement of the link 295. The pressure of the catch 339 upon the surface 341 will prevent any unintentional closing of the clutch 288, 289, and when the starting handle 297 is moved rearward to effect a closing of the said clutch, the surface 341 will press the catch 339 rearward until the notch 340 is in position to be engaged by it. The forward movement of the link 295 causes the projection 300 to engage with the lug 299 and thereby to return the starting handle 297 to its forward or normal position. When the trip arm 336 has completed the forward movement of the link 295, the outer end of the said trip arm clears the end of the link, and, by its spring 337, is drawn forward beneath the latter until it contacts with the leading stud 338 against which it bears until it next comes into contact with the end of the link 295 as previously described. On the end of the shaft 323 there is a trip mechanism identical with that just previously described in connection with the shaft 335, and as the description given of the last-named trip mechanism will equally apply to both of them, no repetition of such description is herein deemed necessary, the correspondence of the reference numerals serving to identify with one another the respective parts of the two said mechanisms.

The forward movement of the link 311 turns the before-mentioned vertical shaft 308 about its axis, and through the clutch fork 307 fast to that shaft, opens the clutch 304, 306 this operation being timed to take place slightly after the above-described opening of the clutch 288, 289. The just-mentioned successive opening of the two clutches is attained through the two worm-wheels 322, 334 being of relatively different diameters.

At or near the middle of the shaft 323 there is secured thereon a grooved cam 342 engaging with a crank arm 343 fast on the lower end of a vertical shaft 344 on whose upper end is secured a crank arm 345 engaging between two collars on a longitudinal movable rod 346 as shown in Fig. 1ª. On the forward end of the rod 346 there is secured a locking wedge 347 which, through a plunger 348, serves to lock the before-described justification rod 153 see also Fig. 13, so that the same shall not be moved when the space wedge 134 is withdrawn at the commencement of the casting operation and passage of the last calipers 36 of each sector 20, 20ª beyond the cam surfaces 50 and 50ª, the cam 342 being timed to move the rod 346 backward and forward at the periods appropriate to the unlocking and locking of the said justification rod.

The shaft 323 has further secured on it a face cam 349 in operative contact with a lever arm 350 fast to a vertical shaft 351 on whose upper end is secured a lever arm 352 which is in constant operative contact with the rear end of a rod 353 carrying at its forward end the before-mentioned pusher 329; a tension spring 354 attached at its respectively opposite ends to the rod 351 and to the plate 1, serves to hold the lever arm 350 and the rod 353 in constant operative contact with the cam 349 and lever arm 352 respectively.

On the before-described shaft 335 there is secured a face cam 355 adapted to engage an anti-friction roller 356 pivoted on a slide 357 and move that slide antagonistically to the tension spring 358, the slide 357 being constrained to move in only longitudinal direction leftward and rightward of the machine. The slide 357 is provided with three inclined cams 357ª, 357ᵇ, 357ᶜ, and with a tooth 359. The inclined cam 357ª is adapted to engage with the tail or rear end of the pawl 191 in such a manner that when the said slide is moved rightward it will disengage the pawl from the rack bar 190. The pawl 191 as previously mentioned, receives its motion from the space key 4, and for that purpose it is pivoted on a lever 360 turning about a pivot 361 fast to the table 1. The front end of the lever 360, which, in normal position, rests against a stop 362, is pivoted to one end of a link 363 whose other end is pivoted to one arm of a lever 364. The other arm of the lever 364 is pivoted to a link 365 which is itself pivoted at its front end to a lever arm 366 fast on the before-mentioned rocking shaft 5.

The lever 360 is provided with an arm 367 engaged by an angle lever 368 pivoted to the table 1 which lever at its rearward end is engaged by the before-mentioned tooth 359 of the slide bar 357. The movement of the rack bar 190, effected through the pawl 191 and the just-described mechanism connecting that pawl with the space key 4, is opposed by a spring 369 which exerts its influence on that rack bar through a lever 370 the rear end of which is connected to the said rack bar by a pin and slot connection.

After the rack bar 190 has been moved leftward by the pawl 191, it is retained in position by a spring-pressed detent 371 pivoted to the table 1 and having a rearwardly extending arm adapted to be engaged by the before-mentioned cam 357[b], the cam surfaces 357[a], 357[b] being adapted to simultaneously release the pawl 191 and detent 371 from the rack bar 190 so that the latter can then be returned to normal position by the spring 369 acting on it through the lever 370.

To prevent undesirable wear of the teeth of the rack 190 and the detent 371, the said rack is moved leftward to advance the respective rack tooth out of actual engaging contact with the detent 371 before the cam 357[b] engages that detent to effect its release from the rack, and this result is attained through the tooth 359 turning the lever 368 so that it turns the lever 360 anti-clockwise and through the pawl 191 moves the rack bar 190 forward to the extent necessary for attaining the said result.

Near the rear end of the link 295 there is pivoted to it one arm of a bell-crank lever 372 pivoted to a fixed bracket 373 and to whose other arm is pivoted a bent rod 374 which is resiliently held to the last-named arm by a tension spring 375. The bent rod 374 is adapted to operate the before-described lever 205 through a pin 376 fast to the latter, and a notch 377 formed in the said rod and held normally in engagement with the pin 376 by the spring 375. The rear end of the rod 374 lies in the path of the cam surface 357[c] which, by acting on that end, serves to disengage the notch 377 from the pin 376 and thereby allow the lever 205 to be returned to normal position by the spring 207, this operation, as previously described serving to pay out the cable 183 and leaving the setting V bar 178 and locking yoke bar 179 free to return to their respective normal positions when the starting handle 297 is moved rearward and, in consequence thereof, the cam 355 commences its rotation, at which juncture an electric switch, not shown in the drawings, on the shaft 335, breaks the circuit through the magnetic detent 177 which thereby allows the summation slide 157 to return to its starting position.

*Mechanism for operating the matrix-selector drums.*

The before-mentioned horizontal shaft 61 is rotated by a chain 378 passing around a sprocket wheel 379 fast on its end, and around the before-mentioned sprocket wheel 294, and on this shaft is secured a worm 380 meshing with a worm-wheel 381, Figs. 1, 1[a] and 11, fast on a vertical shaft on the upper end of which is secured a pinion 382, this pinion meshing with an intermediate wheel 383 which gears with the before-described spur wheel 65. On the shaft 61 there is secured a grooved cam 384 the contour of which, in Fig. 11, is indicated diagrammatically by a single chain line representative of the center of the groove cam. This cam 384 engages with a lever arm 385 fast to shaft 386 on which also is secured a second lever arm 387 which, by a roller carried on its end, engages between two collars 388 on the before-described vertical rod 72. As it is necessary, when effecting the change of magazines, to raise the rod 72 out of the path of the latter, provision is made whereby the lever arm 387 can be readily disengaged from the collars 388, and for that purpose, as shown in Fig. 11, the said arm 387 may be formed in two parts pivotally connected together by a pin 389 and normally held in working relationship to each other and to the collars 388, by a blade spring 390 fast to one of the said parts.

*Space wedge withdrawing mechanism.*

On the shaft 61 there is also secured a grooved cam 391 the shape of which is diagrammatically indicated in Fig. 3 by a single chain line representative of the center line of the cam groove. This cam serves for oscillating a lever 392 about its horizontal axis, and in so doing, to longitudinally reciprocate in fore and aft direction a bar 393 pivoted at its front end to the said lever. In the underside of the bar 393 there is formed a notch 394, shown in dotted lines in Fig. 3, said notch being adapted to engage with a pin 395 fast in the upper end of a lever 396 pivoted at 397 to a stationary bracket 398. The lower end of the lever 396 is of substantially circular form, and there engages with an opening in a rod 399 which is capable of sliding longitudinally in a groove 400 in the upper surface of the table 1. In the rear end of the rod 399 there is provided a slot 401, Fig. 1[a], in which is located a pin 402 secured in the before-described lever 139, and this pin 402 is attached to the rod 399 by a tension spring 403 which normally holds the said pin in contact with the forward end of the slot 401. If and when the guide 137 reaches the justification rod 153 before the rod 399 has completed its forward movement, the further motion which otherwise would be imparted to it by the cam 391 is absorbed by the spring 403 which during that continued operation of the cam would be elongated to a corresponding extent.

It has been hereinbefore explained that the lowermost lever 404 is appropriated to the spacing mechanism and that, unlike the levers 51 above it, it does not act in coöperation with any of the stops 73 or 74 on the matrix selector drums. This particular lever 404 as seen best in Figs. 1ᵃ, 3 and 4ᵃ, carries, at its forward end, a small roller 405 which, when the said lever is acted on by its particular caliper end, is moved from the position in which it is shown in Fig. 4ᵃ and in dotted lines in Fig. 1ᵃ, leftward to the position in which it is shown in chain lines in the last-named figure. When the roller 405 is in normal position as in Fig. 4ᵃ and as shown in dotted lines in Fig. 1ᵃ, it lies in the path of an upwardly inclined end 406 of the above-named rod 393 so that when this rod is moved rearward, the said incline runs up over the roller 405 and effects the disengagement of the notch 394 from the pin 395, thus preventing the lever 396 being operated and consequently having no operative effect on the space wedge 134. When the respective caliper end engages with the cam surface 50ᵃ of the lever 404 it moves the roller 405 out of the path of the rod 393 and thereby allows the notch 394 of that rod to remain in engagement with the pin 395 with the result that the lever 396 is rocked and the space wedge 134 is withdrawn from the blade holders 132, 133, as far as is permitted by the previously adjusted justification rod 153, this afterward resulting in the formation of a space on the next type body to be cast. As shown in Figs. 1ᵃ and 4ᵃ, the cam surface 50ᵃ of the lever 404 is positioned somewhat in advance of the before-described cam surfaces 50 so that the caliper end appropriated to the former cam surface will actuate the lever 404 and the mold blade 117 will be set, just before the casting of the type body which is to bear the space provided for by such setting.

As a means of securing the simultaneous adjustment of the battery of magazines 89 with the battery of set-width cylinders 158 the latter are fast on a shaft 407 which, by miter gearing 408, Fig. 3ᵃ, is geared with the before-mentioned vertical pintle 88 so that as the battery of magazines is turned about the axis of that pintle, the battery of set-width cylinders will be correspondingly rotated to bring the corresponding set-width cylinder into operative position.

Although no special means are represented in the drawing for rotating the shaft 407, it is to be understood that this shaft can be rotated mechanically by any convenient means subject to the control of a manually or equivalently operated device.

From the foregoing description it will be seen that during the operation of the machine two lines may always be in the course of production, one being cast while the other one is being composed.

It is to be understood that the before-described apparatus is given merely as a convenient example and that it is capable of being considerably modified and amplified without departing from the spirit of the invention. For example cam mechanism may be provided for positively relieving the pressure exerted by the front mold wall 114 on the cast type bodies when those bodies have to be moved out of the casting mold toward the galley 330. As hereinbefore explained the machine exemplified in the drawings is provided with 90 different matrices, and in machines provided with a greater number of matrices the arrangement of stops 73, 74 on the drums 55, 56 would be correspondingly different, for instance for 110 matrices there would be ten groups on the drum 55 and eleven groups on the drum 56, and for 132 matrices there would be eleven groups on the drum 55 and twelve groups on the drum 56.

It is further to be understood that the various organs hereinbefore described as operated by or through the keys, may be automatically operated by devices released or controlled by the said keys as for example in the typographical machines known under the trademark linotype, and it is further to be understood that the herein employed terms horizontal, vertical, and others indicative of location or direction are to be regarded as merely relative or arbitrary and not absolute.

Having described our invention, we declare that what we claim and desire to secure by Letters Patent is:—

1. In a typographical casting machine equipped with matrices, the combination of a mold wherein the type elements are successively cast, means for presenting the matrices successively to the mold in the order in which the type characters are to appear in print, a set of adjustable controlling devices or calipers to coöperate with said means in effecting the proper presentation of the matrices to the mold, and selectively controlled means (as a keyboard) for setting up the controlling devices under different conditions of adjustment so as to provide a series of combinations each representative of a character or space of the type line to be cast, the said series of combinations at its completion being exactly symbolic of the locus of the different characters and spaces of the type line irrespective of the set width dimension of either the characters or the spaces.

2. In a machine for casting justified lines of type, the combination of mechanism adapted to automatically and independently of commensurability add together the set-widths which the bodies of said type, independently of the spaces, will have in the finished line, means to subtract the sum from the lock-up length of the line and divide the remainder by the number of spaces in the line and a device set by said means and determining the set-width of the mold for casting spaces which together with all the other spaces and bodies will fill out the line to lock-up length.

3. In a machine for casting justified lines of type, a mold comprising two liners for forming respectively the leading face and the following face of a type body, these liners being relatively adjustable, and that for forming the following face being in two parts whose inner ends conjointly constitute one of the mold walls, one part being adjustable relatively to the other for adjusting the mold to cast spaces integral with type bodies.

4. In a machine for casting justified lines of separate and individual type from matrices presented successively and individually in casting position, the combination with a bi-partite mold liner according to claim 3, of abutments on the matrices determining the casting position of one part of the liner.

5. In a machine for casting justified lines of separate and individual type, the combination with a bi-partite mold liner according to claim 3, of mechanism adapted to automatically adjust one part of the liner to positions which will cause spaces to be cast integral with type bodies of the last-type of each word which spaces together with all the other type bodies and spaces will fill out the line to lock-up length.

6. In a machine for casting justified lines of type, the combination with a bi-partite mold liner according to claim 3 of a wedge engaging with said parts to bring their casting faces into mutual alinement and adjustable to allow said faces to be moved out of alinement.

7. In a machine for casting justified lines of type, the combination with a bi-partite mold liner according to claim 3, of a wedge engaging with said parts to bring their casting faces into mutual alinement and adjustable to allow said faces to be moved out of alinement, and automatic space determining mechanism controlling the extent of movement of the wedge.

8. In a machine for casting justified lines of type, the combination of a plurality of forks each representative of a different character or of a space each with its prongs positioned differently from the prongs of the other forks, devices successively set by the forks representative of the different characters and spaces in a line and means governed by said devices to control the presentation in casting position of character matrices and the formation of justified spaces on the type bodies.

9. In a machine for casting justified lines of type, a receiver drum having rotatable within it a plurality of sectors each carrying a plurality of calipers adapted to engage grooves around the inside of the drum, and selectively-controlled means to cause different calipers to engage different grooves appropriate to the respectively different type characters.

10. In a space determining mechanism, the combination with a summation slide, of an electro-magnetic gripper to engage and move it along, an electro-magnetic detent to engage and retain it in position, and means adapted to move the gripper to the extent of the set-width of each character of a line.

11. In a space determining mechanism, the combination with means adapted to record the total set-width of type characters in the line independently of commensurability among their respective set widths, of means for automatically subtracting that length from the lock-up length of line and automatically dividing the remainder by the number of spaces in the line so as to determine the set-width of each such space.

12. In a space determining mechanism, the combination with a ladder such as 189 of a setting V and a locking yoke operating substantially as and for the purpose described.

13. In a machine for casting justified lines of type, the combination with the gripper claimed in claim 10, of a helical cam adapted to control the extent of movement of the gripper and means controlling the angular movement of the said cam according to the different set-widths of different type characters.

14. In a machine for casting justified lines of type, the combination with a plurality of adjustable matrix magazines of a corresponding plurality of adjustable set-width cylinders operatively connected therewith so that they can be simultaneously adjusted substantially as described and illustrated in the accompanying drawings.

15. An apparatus for producing a line of printing elements including, in combination, a mold, matrices adapted to be presented successively thereto in the order in which the characters are to appear in print, means for casting the printing elements successively in the mold as the matrices are presented thereto, and means for feeding the elements forward as they are cast to locate each previously cast element in position to act as one of the mold walls during the casting of a succeeding element.

16. An apparatus for producing a line of printing elements including, in combination, a mold, matrices adapted to be presented to the mold in the order in which the characters are to appear in print, and means for casting the printing elements in the mold successively and in contact with each other from the presented matrices.

17. An apparatus as specified in claim 16 characterized by the fact that each cast printing element is maintained at a temperature sufficiently low to prevent fusion of its surface by contact with the molten metal of the succeeding element.

18. An apparatus for producing a justified line of printing elements including, in combination, a mold, matrices adapted to be presented thereto, and means for casting the printing elements in said mold from the presented matrices successively in contact with each other and with integral justifying spaces on certain selected elements.

19. An apparatus as specified in claim 18 characterized by the fact that each cast printing element is maintained at a temperature sufficiently low to prevent fusion of its surface by contact with the molten metal of the succeeding element.

20. An apparatus for producing a line of printing elements, including, in combination, a mold, matrices adapted to be presented thereto, and means for casting the printing elements successively in said mold in contact with each other and of varying set widths corresponding to the characters of the presented matrices.

21. An apparatus as specified in claim 20 characterized by the fact that each cast printing element is maintained at a temperature sufficiently low to prevent fusion of its surface by contact with the molten metal of the succeeding element.

22. An apparatus for producing a justified line of printing elements including, in combination, a mold, matrices adapted to be presented thereto, means for casting the printing element successively in the mold from the presented matrices and with integral justifying spaces on certain selected elements, and means for feeding the elements forward as they are cast to locate each previously cast element in position to act as one of the mold walls during the casting of the succeeding element.

23. An apparatus for producing type elements of different set widths including, in combination, a mold, matrices adapted to be presented thereto, means for casting the type elements of the required set widths successively in the mold from the presented matrices, and means for feeding the elements forward as they are cast to different extents according to their set widths to locate each previously cast element in position to act as one of the mold walls during the casting of the succeeding element.

24. An apparatus for producing a line of printing elements, including, in combination, a mold, matrices adapted to be presented thereto and varying in set width according to character, means for casting the printing elements successively in the mold of different set widths corresponding to the presented matrices, and means for feeding the elements forward as they are cast to different extents according to their set widths to locate each previously cast element in position to act as one of the mold walls during the casting of the succeeding element.

25. An apparatus for producing a justified line of printing elements including, in combination, a mold, matrices adapted to be presented thereto and varying in set width according to character, means for casting the printing elements successively in the mold of different set widths corresponding to the presented matrices and with integral justifying spaces on certain selected elements, and means for feeding the elements forward as they are cast to different extents according to their widths to locate each previously cast element in position to act as one of the mold walls during the casting of the succeeding element.

26. An apparatus for producing a line of printing elements including, in combination, a mold, matrices adapted to be presented successively thereto in the order in which the characters are to appear in print, means for injecting molten metal into the mold as each matrix is so presented to cast a printing element bearing the corresponding type character, and means whereby each printing element thus cast is caused to act as one of the mold walls during the casting of the succeeding element.

27. An apparatus for producing combination printing elements of different set widths including, in combination, an adjustable mold, matrices of corresponding set widths adapted to be presented successively thereto, means for adjusting the mold to correspond with the set width of each matrix so presented, means for injecting molten metal into the mold against the presented matrix to cast the corresponding type element, and means whereby each printing element thus cast is caused to act as one of the mold walls during the casting of the succeeding element.

28. An apparatus for producing a justified line of printing elements, including, in combination, an adjustable mold, matrices adapted to be presented successively thereto in the order in which the characters are to appear in print, means for injecting molten metal into the mold as each matrix is so presented to cast a printing element bearing the corresponding type character, means for adjusting the mold when certain selected matrices are presented thereto to cast integral justifying spaces on the corresponding printing elements, and means whereby each printing element thus cast is caused to act as one of the mold walls during the casting of the succeeding element.

29. An apparatus for producing a justified line of printing elements including in combination an adjustable mold, matrices adapted to be presented successively thereto and varying in set width according to character, means for adjusting the mold to correspond with the set width of each matrix so presented, means for adjusting the mold to a further extent when certain selected matrices are presented in accordance with a predetermined justifying space, means for injecting molten metal into the mold against the successively presented matrices, and means whereby each printing element thus cast is caused to act as one of the mold walls during the casting of the succeding element.

30. An apparatus for producing a line of type elements including, in combination, a mold, matrices adapted to be presented thereto, means for casting the type elements successively in the mold from the presented matrices, means for feeding the elements forward as they are cast to locate each previously cast element in position to act as one of the mold walls during the casting of the succeeding element, and means adapted to be operated after the last element is cast, for shifting the line of elements forward as a whole to a position for removal.

31. In a machine for producing lines of printing elements, the combination with matrices and a mold, of means for presenting the matrices successively to the mold in the order in which the characters are to appear in print, means for injecting molten metal into the mold as each matrix is so presented to cast a printing element bearing a corresponding type character, and means for feeding the elements forward as they are cast to locate each element in position to act as one of the mold walls during the casting of the succeeding element.

32. In a machine for producing type elements, the combination with matrices and a mold, of means for presenting the matrices successively to the mold, means for injecting molten metal into the mold as each matrix is so presented to cast a type element, means for feeding the elements forward as they are cast to locate each element in position to act as one of the mold walls during the casting of the succeeding element, and means actuated after the last element is cast for shifting the line of elements forwardly as a whole to a position for removal from the machine.

33. In a machine for producing type elements, the combination with matrices and a mold, of means for presenting the matrices successively to the mold, means for injecting molten metal into the mold as each matrix is so presented to cast a type element, means for feeding the elements forward as they are cast to locate each element in position to act as one of the mold walls during the casting of the succeeding element, means actuated after the last element is cast for shifting the line of elements forwardly as a whole to a position for removal from the machine, together with means for effecting such removal of the line of elements when so positioned.

34. In a typographical casting machine, the combination with matrices of different set widths and an adjustable mold, of means for presenting the matrices successively to the mold, means for adjusting the mold to correspond with the set width of each matrix as it is presented thereto, means for injecting molten metal into the mold against the presented matrix to cast a type element, and means for feeding the type elements forward as they are cast to different extents according to their set widths to locate each previously cast element in position to act as one of the mold walls during the casting of the succeeding element.

35. In a typographical casting machine, the combination with matrices and an adjustable mold, of means for presenting the matrices successively to the mold, means for injecting molten metal into the mold as each matrix is presented thereto, means for adjusting the mold when certain selected matrices are thus presented to produce on the corresponding type elements justifying spaces of a given width, and means for feeding the type elements forward as they are cast to different extents according to width to locate each previously cast element in position to act as one of the mold walls during the casting of the succeeding element.

36. In a typographical casting machine, the combination with matrices of different set widths and an adjustable mold, of means for presenting the matrices successively to the mold, means for injecting molten metal into the mold as each matrix is presented thereto, means for adjusting the mold to correspond with the set widths of the matrices, means for further adjusting the mold to produce on certain of the type elements justifying spaces of a given width, and means for feeding the type elements forward as they are cast to different extents according to width to locate each previously cast element in position to act as one of the mold walls during the casting of the succeeding element.

37. In a typographical casting machine, the combination with matrices and an adjustable mold, of means for presenting the matrices successively to the mold, means for injecting molten metal into the mold as each matrix is presented thereto, automatic space determining mechanism for controlling the adjustment of the mold at predetermined periods, and means for feeding the type elements forward as they are cast to locate each previously cast element in position to act as one of the mold walls during the casting of the succeeding element.

38. In a typographical casting machine, the combination with matrices and an adjustable mold, of means for presenting the matrices successively to the mold, means for injecting molten metal into the mold as each matrix is presented thereto, means for adjusting the mold in accordance with the set width of the presented matrix, automatic space determining mechanism for controlling the further adjustment of the mold at predetermined periods, and means for feeding the type elements forward as they are cast to locate each previously cast element in position to act as one of the mold walls during the casting of the succeeding element.

39. In a typographical casting machine, the combination with matrices and an adjustable mold, of means for presenting the matrices successively to the mold, means for injecting molten metal into the mold as each matrix is presented thereto, means controlled by the individual matrices for effecting the adjustment of the mold in accordance with their set widths, and means for feeding the type elements forward as they are cast to locate each previously cast element in position to act as one of the mold walls during the casting of the succeeding element.

40. In a machine for producing type elements, the combination of a mold having a cavity wherein the said elements are successively cast, said mold including two side walls distinct from the type elements and between which the first type element is cast, and means for feeding the type elements forward as they are cast to locate each previously cast element in position to act as a mold wall for the next succeeding element, the said mold having one of its side walls movable away from the mold cavity to permit such feeding of the type elements.

41. A type casting mold having a cavity wherein the type elements are successively cast and including two side walls distinct from the type elements and between which the first element is cast, one of said walls being reciprocable to feed the type elements forward as they are cast to locate each previously cast element in position to act as a mold wall in the casting of the next succeeding element, and the other mold wall being yieldingly arranged to permit such feeding of the type elements.

42. An apparatus for casting a line of type elements embodying a mold wherein the type elements are successively cast, the said mold including two side walls between which the first element is cast, one reciprocable to feed the type elements forward as they are cast to locate each previously cast element in position to act as a mold wall during the casting of the succeeding element, and the other side wall being yieldingly arranged to permit such feeding of the type elements, and the two side walls being movable together when the last element of the line has been cast to carry the line forwardly as a whole to a position for removal.

43. An apparatus for producing type elements including, in combination, a mold, matrices adapted to be presented successively thereto, and means for injecting molten metal into the mold as each matrix is presented thereto, the said mold including a liner constituting one of the mold walls and arranged to be set in different positions setwise of the mold and reciprocable after each casting operation to feed the successive type elements forward to locate each previously cast element in position to act as one of the mold walls during the casting of the succeeding element.

44. An apparatus for producing type elements including, in combination, a mold, matrices adapted to be presented successively thereto, and means for injecting molten metal into the mold as each matrix is presented thereto, the said mold including a liner constituting one of the mold walls and arranged to engage the successive matrices to adapt the mold cavity to the set widths of the matrices and reciprocable after each casting operation to feed the successive type elements forward to locate each previously cast element in position to act as one of the mold walls during the casting of the succeeding element.

45. An apparatus for producing type elements including, in combination, a mold, matrices adapted to be presented successively thereto, and means for injecting molten metal into the mold as each matrix is presented thereto, the said mold including a liner constituting one of the mold walls and formed in two sections relatively adjustable setwise of the mold and reciprocable after each casting operation to feed the successive type elements forward to locate each previously cast element in a position to act as one of the mold walls during the casting of the succeeding element.

46. In an apparatus for producing type elements, the combination of a mold, including an adjustable liner constituting one of its side walls, matrices adapted to be presented successively to the mold, means for injecting molten metal into the mold as each matrix is presented thereto, means for setting the mold liner in different positions setwise of the mold to correspond with the set widths of the matrices, and means for reciprocating said liner after each casting operation to feed the successive type elements forward the required distance to locate each previously cast element in position to act as one of the mold walls during the casting of the succeeding element.

47. In an apparatus for producing type elements, the combination of a mold having a liner constituting one of its walls and adjustable to different positions setwise of the mold, matrices adapted to be presented successively to the mold and controlling the position of the mold liner, means for injecting molten metal into the mold as each matrix is presented thereto, and means for reciprocating the mold liner after each casting operation to feed the successive type elements forward the required distances to locate each previously cast element in position to act as one of the mold walls during the casting of the succeeding element.

48. In an apparatus for producing type elements, the combination of a mold having a liner formed in two sections relatively adjustable setwise of the mold, matrices adapted to be presented successively to the mold, means for injecting molten metal into the mold as each matrix is presented thereto, means for effecting the relative adjustment of the liner sections at the commencement of certain casting operations, and means for reciprocating the liner after each casting operation to feed the successively cast type elements forward the required distances to locate each previously cast element in position to act as one of the mold walls during the casting of the succeeding element.

49. In an apparatus for producing type elements, the combination of a mold having a liner adjustable to different positions setwise of the mold and comprising two sections relatively adjustable setwise of the mold, matrices adapted to be presented to the mold, means for controlling the setwise adjustment of the liner in accordance with the set width of the presented matrices, further means for controlling the relative adjustment of the liner sections, and means for reciprocating the liner after each casting operation to feed the successive type elements forward the required distances to locate each previously cast element in position to act as one of the mold walls during the casting of the succeeding element.

50. An apparatus for producing type elements including, in combination, matrices, and a mold to which the matrices are successively presented and having a cavity wherein the type elements are successively cast and including a liner constituting one of the walls of the mold cavity and reciprocable to feed the type elements forward as they are cast to locate each previously cast element in position to act as one of the mold walls during the casting of the succeeding element, the said liner being formed with a bevel at its upper corner to produce on each type element an overhanging projection to extend under the matrix presented in the casting of the succeeding element for the purpose described.

51. An apparatus for producing type elements including in combination, matrices, and a mold to which the matrices are successively presented and having a cavity wherein the type elements are successively cast and including a liner constituting one of the walls of the cavity, the said liner being formed with a bevel at its upper corner to produce an overhanging projection on each type element cast to extend under the matrix presented in the casting of the succeeding element for the purpose described.

52. A mold having a cavity wherein the type elements are successively cast and including a liner formed in two sections whose inner ends conjointly constitute one of the walls of said cavity, the said liner sections being relatively adjustable setwise of the mold, for the purpose described.

53. A mold having a cavity wherein the type elements are successively cast and including a liner formed in two sections whose inner ends conjointly constitute one of the walls of said cavity, the said liner being adjustable to different positions setwise of the mold and having its two sections relatively adjustable setwise of the mold, for the purpose described.

54. In a machine for casting justified lines of type equipped with matrices, the combination of a mold having a cavity wherein the type elements are successively cast and including a liner constituting one of the walls of said cavity, the said liner being formed in two sections relatively adjustable setwise of the mold, selectively operated means (as a keyboard) for causing the presentation of the matrices successively to the mold, and space determining mechanism controlled by said means independently of the matrices to effect the required adjustment of the liner sections.

55. In a machine for casting justified lines of type equipped with matrices, the combination of a mold having a cavity wherein the type elements are successively cast and including an adjustable liner constituting one of the walls of said cavity, the said liner being formed in two sections relatively adjustable setwise of the mold, selectively operated means (as a keyboard) for causing the presentation of the matrices successively to the mold, means controlled by the matrices to determine the setwise position of the liner as a whole, and space determining mechanism controlled by the selectively operated means independently of the matrices to effect the relative adjustment of the liner sections in the required manner.

56. In a typographical casting machine, the combination with a mold having a cavity wherein the type elements are successively cast and including a liner constituting one of the walls of said cavity, the said liner being formed in two sections relatively adjustable setwise of the mold, of a justifying wedge controlling the adjustment of said liner sections.

57. In a typographical casting machine, the combination with a mold having a cavity wherein the type elements are successively cast and including a liner constituting one of the walls of said cavity, the said liner being adjustable to different positions setwise of the mold and comprising two sections relatively adjustable setwise of the mold, of a justifying wedge controlling the relative adjustment of the liner sections and shiftable laterally to correspond to the adjusted position of the liner.

58. In a typographical casting machine, the combination with a mold having a cavity wherein the type elements are successively cast and including a liner constituting one of the walls of said cavity, the said liner being formed in two sections relatively adjustable setwise of the mold, of a longitudinally movable wedge controlling the adjustment of the liner sections, and means for withdrawing the wedge to its full extent before the final casting operation to cause the mold to cast on the last type element of a line any space necessary to fill out the line completely.

59. In a typographical casting machine, the combination with a mold having a cavity wherein the type elements are successively cast and including a liner constituting one of the walls of the said cavity, the said liner being formed in two sections relatively adjustable setwise of the mold, of means for effecting the relative adjustment of the liner sections before the casting of the last type element of a line to cast on said element any space necessary to fill out the line completely.

60. A type casting mold having a cavity wherein the type elements are successively cast and including two relatively adjustable liners constituting opposing walls of the mold cavity, one of said liners being formed in two sections relatively adjustable setwise of the mold, and stop devices carried by the two liners and adapted to be brought into engagement before the casting of the last type element of a line, for the purpose described.

61. In a machine for casting justified lines of type comprising matrices, the combination of an adjustable mold wherein the type elements are successively cast, selectively operated means (as a keyboard) for causing the presentation of the matrices successively to the mold, justifying mechanism coöperating with said means independently of the matrices for determining the amount of space necessary to fill out the line and to apportion such space among the word groups to occur in the line, and devices governed by said justifying mechanism to adjust the mold at the required periods in accordance with such apportioned space.

62. In a machine for casting justified lines of type comprising matrices, the combination of an adjustable mold wherein the type elements are successively cast, selectively operated means (as a keyboard) for causing the presentation of the matrices successively to the mold, a justifying mechanism coöperating with said means for determining the amount of space necessary to fill out the line and to apportion such space among the word groups to occur in the line, and devices governed by said justifying mechanism to adjust the mold at the commencement of the casting operation of the last type element of each word except the last to cast on said element an integral space of the apportioned width determined by the justifying mechanism.

63. In a machine for casting justified lines of type comprising matrices, the combination of an adjustable mold wherein the type elements are successively cast, selectively operated means (as a keyboard) for causing the presentation of the matrices successively to the mold, a justifying mechanism coöperating with said means for determining the amount of space necessary to fill out the line and to apportion such space among the word groups to occur in the line, devices governed by said justifying mechanism to adjust the mold at the commencement of the casting operation of the last type element of each word except the last to cast on said element an integral space of the apportioned width determined by the justified mechanism, and means for adjusting the mold at the commencement of the casting operation for the last type element of the line to cast on said element any space necessary to fill out the line or in excess of that determined by the justifying mechanism.

64. In a machine casting justified lines of type comprising matrices, the combination of an adjustable mold wherein the type elements are successively cast, and selectively operated means (as a keyboard) for causing the presentation of the matrices successively to the mold, with justifying mechanism coöperating with said means independently of the matrices and including a device for measuring the total set widths of the characters of a line, a device for determining the amount of space necessary to fill out the line, and a device for apportioning said space among the word groups to occur in the line, and means controlled by the last mentioned device to effect the adjustment of the mold at the required periods in accordance with the apportioned space so determined.

65. A space determining mechanism including, in combination, the summation slide, 157, the rack, 190, carrying the ladder, 189, and the two connected slides, 178 and 179, all constructed and operating substantially in the manner shown and described.

66. In a typographical machine, the combination of a mold, matrices adapted to be presented successively thereto, a swinging alining plate having an aperture to receive the individual matrices and locate them in proper position before the mold, and a stop to arrest the swinging plate in its alining position.

67. In a typographical machine, the combination of a mold, a matrix, a pivoted bar carrying the matrix and operable to present it before the mold, the said matrix being supported in the carrying bar so as to be movable facewise relatively thereto, and means acting when the matrix is presented before the mold to shift it facewise relatively to its carrying bar to effect the firm engagement of the matrix with the mold.

68. In a typographical casting machine, the combination of a mold for casting type, a plurality of magazines, each containing a complete font of matrices, and operating devices to coöperate with matrices of one font at a time, the said magazines being movably arranged so that any selected font of matrices may be brought into operative relation to the mold and the operating devices, and the matrices in each magazine being carried by pivoted bars, which when the magazine is in operative position are arranged in a circle described from the mold as a center.

69. In a typographical machine, the combination of space determining mechanism, including a member for measuring the set widths of the type characters of a line, means for actuating said member, and means whereby the extent of operation of said measuring member may be varied at will to correspond to the set widths of type characters of different fonts.

70. In a machine for casting justified lines of type, the combination with a plurality of matrix fonts of different set widths and any selected one of which may be brought into use at will, a type casting mold, and selectively operated means (as a keyboard) for causing the presentation of the matrices of the selected font successively to the mold, of space determining mechanism, including a member operated by the selectively controlled means to measure the set widths of the matrices to be presented to the mold, and means whereby the operation of the measuring member may be varied to correspond to the font of matrices in use.

71. In a machine for casting justified lines of type, the combination with a plurality of matrix fonts of different set widths and any selected one of which may be brought into use at will, a type casting mold, and selectively operated means (as a keyboard) for causing the presentation of the matrices of the selected font successively to the mold, of space determining mechanism, including a summation slide advanced progressively by the selectively operated means to different extents in proportion to the set widths of the matrices of the selected font, and means whereby the progressive advance of the summation slide may be varied when a different font is brought into use to correspond with the different set widths of the matrices of such new font.

72. In a typographical machine, the combination with space determining mechanism, including a device to measure the set widths of the type characters of a line, of selectively controlled means (as a keyboard), means actuated thereby for operating the measuring device, and means whereby the extent of operation of said measuring device may be varied to correspond to the set widths of type characters of different fonts.

73. In a typographical machine, the combination with space determining mechanism including a summation slide, of selectively controlled means (as a keyboard), means actuated by the selectively controlled means for advancing the summation slide progressively to different extents in proportion to the type characters to appear in line, and means whereby the progressive advance of the slide may be proportionately varied to correspond to the set widths of type characters of different fonts.

74. In a typographical machine, the combination with space determining mechanism including a summation slide, of a series of selectively controlled devices representative of different type characters (as for instance the finger keys of a keyboard), actuating connections between said devices and the summation slide, and means including a helical cam coöperating with the actuating connections to control the extent of movement of the slide.

75. In a typographical machine, the combination with space determining mechanism including a summation slide of a series of selectively controlled devices representative of different type characters (as for instance the finger keys of a keyboard), actuating connections between said devices and the summation slide, and means coöperating with the actuating connections to control the extent of movement of the summation slide, the said means including a helical cam and a series of stop pins set by the selectively controlled devices for arresting the cam in different positions according to the set widths of the characters represented by said devices.

76. In a typographical machine, the combination with space determining mechanism, including a summation slide, of a series of selectively controlled devices representative of different type characters (as for instance the finger keys of a keyboard), actuating connections between said devices and the summation slide, and means coöperating with the actuating connections to control the extent of the movement of the summation slide, the said means including a helical cam and a series of stop pins set by the selectively controlled devices for arresting the cam in different positions according to the set widths of the characters represented by said devices, the said stop pins being removable from operative position and replaceable by another series of stop pins arranged to arrest the cam in positions appropriate to the set widths of type characters of a different font.

77. In a typographical machine, the combination with space determining mechanism including a summation slide, of a series of selectively controlled devices representative of different type characters, and means controlled by said devices for advancing the summation slide progressively in proportion to the set widths of type characters of a given font and irrespective of the commensurability of such widths.

78. In a typographical machine, the combination of a series of matrix bars, and means for operating said bars successively, said means including two sets of actuating devices, one operated by the other, and shiftable to different relative positions in effecting the operation of individual matrix bars.

79. In a typographical machine, the combination of a series of matrix bars, and means for operating said bars successively, said means including two sets of actuating devices, one operated by the other, and shiftable to different relative positions in effecting the operation of individual matrix bars, with selectively controlled means (as a keyboard) for determining the relative positions of the actuating devices.

80. In a typographical machine, the combination with a series of matrix bars, of means for operating said bars successively and including the two frictionally rotated drums, 55 and 56, formed with the stops, 73 and 74, arranged in groups and carrying the actuating devices, 76 and 85, corresponding in number to that of the stops, 73 and 74, in each group respectively, and means coöperating with said drums to arrest them in different positions to locate different pairs of actuating devices in engaging relation in effecting the successive operation of the matrix bars.

81. In a typographical casting machine equipped with matrices, the combination of a mold wherein the type elements are successively cast, operating devices for presenting the matrices successively to the mold, a set of adjustable controlling devices or calipers to control the actuation of said operating devices, and selectively operated means (as a keyboard) for setting up the controlling devices under different conditions of adjustment to provide a series of combinations representative of the type characters to appear in line so as thus to effect the proper presentation of the matrices to the mold.

82. In a typographical casting machine equipped with matrices, the combination of a mold wherein the type elements are successively cast, operating devices for presenting the matrices successively to the mold, a plurality of sets of adjustable controlling devices or calipers to control the actuation of said operating devices, and selectively operated means (as a keyboard) to coöperate successively with the sets of controlling devices and to set up said devices under different conditions of adjustment in their respective sets to provide series of combinations representative of the type characters to appear in succeeding lines.

83. In a typographical machine, the combination of a set of calipers having springs tending constantly to separate the members thereof, means for advancing the calipers step by step, and a row of tongues or stop pins arranged to coöperate with the calipers successively in their advance and operable in pairs to control the extent of separation of the caliper members.

84. In a typographical machine, the combination of a set of calipers having springs tending constantly to separate the members thereof, means for advancing the calipers step by step, a row of tongues or stop pins arranged to coöperate with the calipers successively in their advance and operable in pairs to control the extent of separation of the caliper members, and selectively controlled means (as a keyboard) for effecting the operation of the tongues or stop pins.

85. In a typographical machine, the combination of a set of calipers having springs tending constantly to separate the members thereof, means for advancing the calipers step by step, a row of tongues or stop pins arranged to coöperate with the calipers successively in their advance and operable in pairs to control the extent of separation of the caliper members, and selectively controlled means (as a keyboard) for effecting the step by step advance of the calipers and for operating the tongues or stop pins as the calipers are presented thereto.

86. In a typographical machine, the combination of a set of calipers having springs tending constantly to separate the members thereof, means for advancing the calipers step by step, and a row of tongues or stop pins arranged to coöperate with the calipers successively in their advance and operable in pairs to control the extent of separation of the caliper members, with means for maintaining the calipers in their separated condition after they are acted upon by the tongues or stop pins.

87. In a typographical machine, the combination of a set of calipers having springs tending constantly to separate the members thereof, means for advancing the calipers step by step, and a row of tongues or stop pins arranged to coöperate with the calipers successively in their advance and operable in pairs to control the extent of separation of the caliper members, with a receiver having grooves wherein the caliper members engage after they are acted upon by the tongues or stop pins.

88. In a typographical machine, the combination of a set of calipers having springs tending constantly to separate the members thereof, means for advancing the calipers step by step, and a row of tongues or stop pins arranged to coöperate with the calipers successively in their advance and operable in pairs to control the extent of separation of the caliper members, with means for maintaining the calipers in their separated condition after they are acted upon by the tongues or stop pins, and means for closing the caliper members before they are again presented to the action of said tongues or stop pins.

89. In a typographical machine, the combination of a set of calipers having springs tending constantly to separate the members thereof, means for advancing the calipers step by step, and a row of tongues or stop pins arranged to coöperate with the calipers successively in their advance and operable in pairs to control the extent of separation of the caliper members, with a receiver having grooves wherein the caliper members engage after they are acted upon by the tongues or stop pins, and having a further groove communicating with the others and tapering toward a common point to effect the closing of the caliper members before they are again presented to the action of the tongues or stop pins.

90. In a typographical machine, the combination of a row of tongues or stop pins, lectively controlled devices (as the finger keys of a keyboard), and means actuated thereby for operating the tongues or stop pins in pairs, the said means including a series of forks, one for each selectively controlled device, and having prongs arranged in different relative positions on the respective forks.

91. In a typographical machine, the combination of a row of tongues or stop pins, selectively controlled devices (as the finger keys of the keyboard), and means actuated thereby for operating the tongues or stop pins in pairs, the said means including a plurality of bails connected to the respective tongues or stop pins, a series of forks connected to the respective selectively controlled devices, the said forks each having a pair of prongs arranged in engagement with two of the bails, and the prongs being located in different relative positions on the respective forks for the purpose described.

In witness whereof we have hereunto set our hands in the presence of two witnesses.

MARK BARR.
THOMAS FREDERICK MAW.

Witnesses:
HENRY HART,
WARWICK HENRY WILLIAMS.